(12) United States Patent
Kim et al.

(10) Patent No.: US 11,556,765 B2
(45) Date of Patent: Jan. 17, 2023

(54) NEUROMORPHIC SYSTEM AND OPERATING METHOD THEREOF

(71) Applicant: SAMSUNG ELECTRONICS CO., LTD., Suwon-si (KR)

(72) Inventors: Jae-Joon Kim, Pohang-si (KR); Jinseok Kim, Incheon (KR); Taesu Kim, Incheon (KR)

(73) Assignee: POSTECH ACADEMY-INDUSTRY FOUNDATION, Gyeongsangbuk-do (KR)

( * ) Notice: Subject to any disclaimer, the term of this patent is extended or adjusted under 35 U.S.C. 154(b) by 585 days.

(21) Appl. No.: 16/454,881

(22) Filed: Jun. 27, 2019

(65) Prior Publication Data
US 2020/0012925 A1    Jan. 9, 2020

(30) Foreign Application Priority Data

Jul. 6, 2018  (KR) ......................... 10-2018-0079011

(51) Int. Cl.
| | | |
|---|---|---|
| G06F 15/18 | (2006.01) | |
| G06N 3/08 | (2006.01) | |
| G06N 3/063 | (2006.01) | |
| G06N 5/04 | (2006.01) | |

(52) U.S. Cl.
CPC ............... *G06N 3/063* (2013.01); *G06N 3/08* (2013.01); *G06N 5/04* (2013.01)

(58) Field of Classification Search
CPC .......... G06N 3/049; G06N 3/063; G06N 3/08; G06N 3/04; G06N 3/088; G06N 20/00; G06N 3/0454; G06N 5/04; G06N 3/0635; G06N 3/084; G06N 99/005
See application file for complete search history.

(56) References Cited

U.S. PATENT DOCUMENTS

| | | |
|---|---|---|
| 8,843,425 B2 | 9/2014 | Modha |
| 9,218,564 B2 | 12/2015 | Arthur et al. |

(Continued)

FOREIGN PATENT DOCUMENTS

KR    101686827 B1    12/2016

OTHER PUBLICATIONS

Paul A. Merolla, et al., "A million spiking-neuron integrated circuit with a scalable communication network and interface", SCIENCE, vol. 345, ISSUE 6197, pp. 668-673 Aug. 8, 2014.

(Continued)

*Primary Examiner* — Luis A Sitiriche
(74) *Attorney, Agent, or Firm* — Harness, Dickey & Pierce, P.L.C.

(57) ABSTRACT

A neuromorphic system includes an address translation device that translates an address corresponding to each of synaptic weights between presynaptic neurons and postsynaptic neurons to generate a translation address, and a plurality of synapse memories that store the synaptic weights based on the translation address. The translation address is generated such that at least two of synaptic weights corresponding to each of the postsynaptic neurons are stored in different synapse memories of the plurality of synapse memories and such that at least two of synaptic weights corresponding to each of the presynaptic neurons are stored in different synapse memories.

20 Claims, 11 Drawing Sheets

(56) References Cited

U.S. PATENT DOCUMENTS

| | | | | |
|---|---|---|---|---|
| 2013/0144821 | A1* | 6/2013 | Heliot | G06N 3/02 |
| | | | | 706/15 |
| 2017/0004089 | A1* | 1/2017 | Clemons | G06F 12/0893 |
| 2017/0200094 | A1* | 7/2017 | Bruestle | G06N 3/08 |
| 2018/0143762 | A1* | 5/2018 | Kim | G06F 11/00 |
| 2018/0189646 | A1* | 7/2018 | Kumar | G06N 3/049 |
| 2019/0042930 | A1* | 2/2019 | Pugsley | G06N 3/088 |

OTHER PUBLICATIONS

Paul Merolla, et al., "A Digital Neurosynaptic Core Using Embedded Crossbar Memory with 45pJ per Spike in 45nm", IEEE, pp. 1-4, 2011.

Jae-sun Seo, et al., "A 45nm CMOS Neuromorphic Chip with a Scalable Architecture for Learning in Networks of Spiking Neurons", IEEE, pp. 1-4, 2011.

* cited by examiner

NEUROMORPHIC SYSTEM AND OPERATING METHOD THEREOF

CROSS-REFERENCE TO RELATED APPLICATIONS

This application claims priority under 35 U.S.C. § 119 to Korean Patent Application No. 10-2018-0079011 filed on Jul. 6, 2018, in the Korean Intellectual Property Office, the disclosure of which is hereby incorporated by reference.

BACKGROUND

Embodiments of the inventive concepts described herein relate to a neuromorphic system, and more particularly, relate to a neuromorphic processor capable of quickly accessing a synaptic weight stored in a memory and an operating method thereof.

The brain contains hundreds of billions of nerve cells, that is, neurons, each of which may learn and remember information by exchanging signals with another neuron through synapses. When a sum of synapse potentials input through dendrites is greater than a threshold potential, the neuron may generate an action potential to transfer a signal to another neuron through an axon. This is called "spiking of a neuron". In the case where the spiking of the neuron occurs, the intensity of the signal transferred from the neuron may vary with the connection strength of a synapse between a neuron and another neuron. That is, the intensity of the signal that is transferred to the neuron may vary when the connection strength of the synapse is adjusted, and thus, the learning and memory of information may be made.

The neuromorphic system is a semiconductor circuit designed to mimic a process where a biological nerve cell (or a neuron) transfers and processes information. The neuromorphic system may store a synaptic weight being a value corresponding to the connection strength of the synapse in a memory and may perform signal processing based on the stored weight. That is, the neuromorphic system may be used to implement a system that is intellectualized to mimic the brain of the human. Accordingly, the neuromorphic system may be used for character recognition, voice recognition, danger recognition, real-time high-speed signal processing, etc.

For various signal processing such as character recognition, voice recognition, etc., the neuromorphic system may perform learning (e.g. training) and inference on input data based on a synaptic weight stored in a memory. In the learning and inference process, the neuromorphic system may access the synaptic weight stored in the memory. In the case where a speed at which a synaptic weight is accessed is slow, a signal processing speed of the neuromorphic system may become slow. That is, the performance of the neuromorphic system may be reduced.

SUMMARY

Embodiments of the inventive concepts provide a neuromorphic system capable of improving a speed at which a synaptic weight stored in a memory is accessed in learning and inference operations for input data and an operating method thereof.

A neuromorphic system according to an embodiment of the inventive concepts includes an address translation device that translates an address corresponding to each of synaptic weights between presynaptic neurons and postsynaptic neurons to generate a translation address, and a plurality of synapse memories that store the synaptic weights based on the translation address. The translation address is generated such that at least two of synaptic weights corresponding to each of the postsynaptic neurons are stored in different synapse memories of the plurality of synapse memories and such that at least two of synaptic weights corresponding to each of the presynaptic neurons are stored in different synapse memories.

In an embodiment, the address translation device may transfer each of the synaptic weights to a synapse memory corresponding to a memory address of the translation address from among the plurality of synapse memories, and may transfer a block address of the translation address to the synapse memory corresponding to the memory address, and the synapse memory corresponding to the memory address may store the transferred synaptic weight in a memory block that the block address indicates.

In an embodiment, the address translation device may include a controller that generates the translation address from the address in compliance with a given translation rule and generates a shift signal based on the memory address of the translation address and a transfer order of the address, and a shifter that transfers each of the synaptic weights to the synapse memory corresponding to the memory address based on the shift signal.

In an embodiment, the controller may generate an identical shift signal with respect to synaptic weights corresponding to each of the presynaptic neurons, and may generate different shift signals with respect to synaptic weights corresponding to different presynaptic neurons.

In an embodiment, the address translation device may transfer a block address of the translation address to a synapse memory corresponding to a memory address of the translation address from among the plurality of synapse memories, and the synapse memory corresponding to the memory address may output a synaptic weight from a memory block that the block address indicates.

In an embodiment, the address translation device may transfer identical block addresses to the plurality of synapse memories, and the plurality of synapse memories may output synaptic weights corresponding to a specific presynaptic neuron of the presynaptic neurons in response to the identical block addresses.

In an embodiment, the address translation device may transfer different block addresses with respect to the plurality of synapse memories, and the plurality of synapse memories may output synaptic weights corresponding to a specific postsynaptic neuron of the postsynaptic neurons in response to the different block addresses.

In an embodiment, the address translation device may include a conversion address table that stores the address and the translation address, a controller that generates a shift signal based on a transfer order of the address and the memory address of the translation address stored in the translation address table, and a shifter that reorders the output synaptic weight based on the shift signal so as to correspond to the transfer order of the address.

The neuromorphic system according to an embodiment of the inventive concepts may further include a processing device that updates the synaptic weights based on a spike of the presynaptic neurons or the postsynaptic neurons, and the plurality of synapse memories may store the updated synaptic weights based on a translation address corresponding to each of the updated synaptic weights.

According to an embodiment of the inventive concepts, an operating method of a neuromorphic system which includes a plurality of synapse memories storing synaptic weights between presynaptic neurons and postsynaptic neurons may include translating an address corresponding to each of the synaptic weights in response to a write command for the synaptic weights to generate a translation address, and storing the synaptic weights in the plurality of synapse memories based on the translation address, and the translation address may be generated such that at least two of synaptic weights corresponding to each of the postsynaptic neurons are stored in different synapse memories of the plurality of synapse memories and such that at least two of synaptic weights corresponding to each of the presynaptic neurons are stored in different synapse memories.

The method according to an embodiment of the inventive concepts may further include providing each of the synaptic weights to a synapse memory corresponding to a memory address of the translation address from among the plurality of synapse memories, and providing a block address of the translation address to the synapse memory corresponding to the memory address, and the storing of the synaptic weights may include storing each of the synaptic weights in the synapse memory corresponding to the memory address, based on the block address.

The method according to an embodiment of the inventive concepts may further include generating a shift signal based on a transfer order of the address and the memory address of the translation address, and each of the synaptic weights may be transferred to the synapse memory corresponding to the memory address based on the shift signal.

In an embodiment, the shift signal may be identically generated with respect to synaptic weights corresponding to each of the presynaptic neurons and may be differently generated with respect to synaptic weights corresponding to different presynaptic neurons.

The method according to an embodiment of the inventive concepts may further include receiving a read command for the synaptic weights and an address corresponding to each of the synaptic weights, and outputting the synaptic weights from the plurality of synapse memories based on the translation address corresponding to the address in response to the read command.

In an embodiment, the outputting of the synaptic weights may include obtaining the translation address corresponding to the address, providing a block address of the translation address to a synapse memory corresponding to a memory address of the translation address from among the plurality of synapse memories, and outputting a synaptic weight corresponding to the block address from the synapse memory corresponding to the memory address.

The method according to an embodiment of the inventive concepts may further include generating a shift signal based on a transfer order of the address and the memory address of the translation address, and reordering the output synaptic weights based on the shift signal so as to correspond to the transfer order of the address.

A neuromorphic system according to an embodiment of the inventive concepts may include an address translation device that generates translation addresses by shifting memory addresses of first row addresses of an address matrix corresponding to neural network-based synaptic weights as much as a first value and shifting memory addresses of second row addresses of the address matrix as much as a second value different from the first value, and a plurality of synapse memories that store synaptic weights corresponding to identical memory addresses in an identical synapse memory based on the translation addresses.

In an embodiment, the first value and the second value may be an integer that is less than a number of the plurality of synapse memories and is 0 or more.

In an embodiment, the address translation device may transfer a synaptic weight corresponding to each of the translation addresses to a synapse memory corresponding to a memory address of each of the translation addresses from among the plurality of synapse memories, and may transfer a block address of each of the translation addresses to the synapse memory corresponding to the memory address, and the synapse memory corresponding to the memory address may store the transferred synaptic weight in a memory block that the block address indicates.

In an embodiment, the address translation device may transfer a block address of each of the translation addresses to a synapse memory corresponding to a memory address of each of the translation addresses from among the plurality of synapse memories, and the synapse memory corresponding to the memory address may output a synaptic weight from a memory block that the block address indicates.

BRIEF DESCRIPTION OF THE FIGURES

The above and other objects and features of the inventive concepts will become apparent by describing in detail exemplary embodiments thereof with reference to the accompanying drawings.

DETAILED DESCRIPTION

Hereinafter, embodiments of the inventive concepts are described in detail with reference to the accompanying drawings. In the following description, specific details such as detailed components and structures are merely provided to assist the overall understanding of the embodiments of the inventive concepts. Therefore, it should be apparent to those skilled in the art that various changes and modifications of the embodiments described herein may be made without departing from the scope and spirit of the present invention. In addition, descriptions of well-known functions and structures are omitted for clarity and conciseness. The terms described below are terms defined in consideration of the functions in the inventive concepts and are not limited to a specific function. The definitions of the terms should be determined based on the contents throughout the specification.

In the following drawings or in the detailed description, modules may be illustrated in a drawing or may be connected with any other components other than components in the detailed description. Components may be connected directly or indirectly. Components may be connected through communication or may be physically connected.

Components in the detailed description may be implemented in the form of software, hardware, or a combination thereof. In an embodiment, the software may be a machine code, firmware, an embedded code, and application software. For example, the hardware may include an electrical circuit, an electronic circuit, a processor, a computer, an integrated circuit, integrated circuit cores, a microelectromechanical system (MEMS), a passive element, or a combination thereof.

Unless defined differently, all terms used herein, which include technical terminologies or scientific terminologies, have the same meaning as that understood by a person skilled in the art to which the present invention belongs. Terms defined in a generally used dictionary are to be interpreted to have meanings equal to the contextual meanings in a relevant technical field, and are not interpreted to have ideal or excessively formal meanings unless clearly defined in the specification.

A neuromorphic system according to embodiments of the inventive concepts may operate based on a neural network including a plurality of neurons and a plurality of synapses. Based on the neural network, the neuromorphic system may perform learning (e.g. training) on input data or may perform inference on the input data. Through the learning and inference for the input data, the neuromorphic system may perform various operations such as a character recognition operation, a voice recognition operation, a danger recognition operation, a real-time high-speed signal processing operation, etc.

Figure 1:
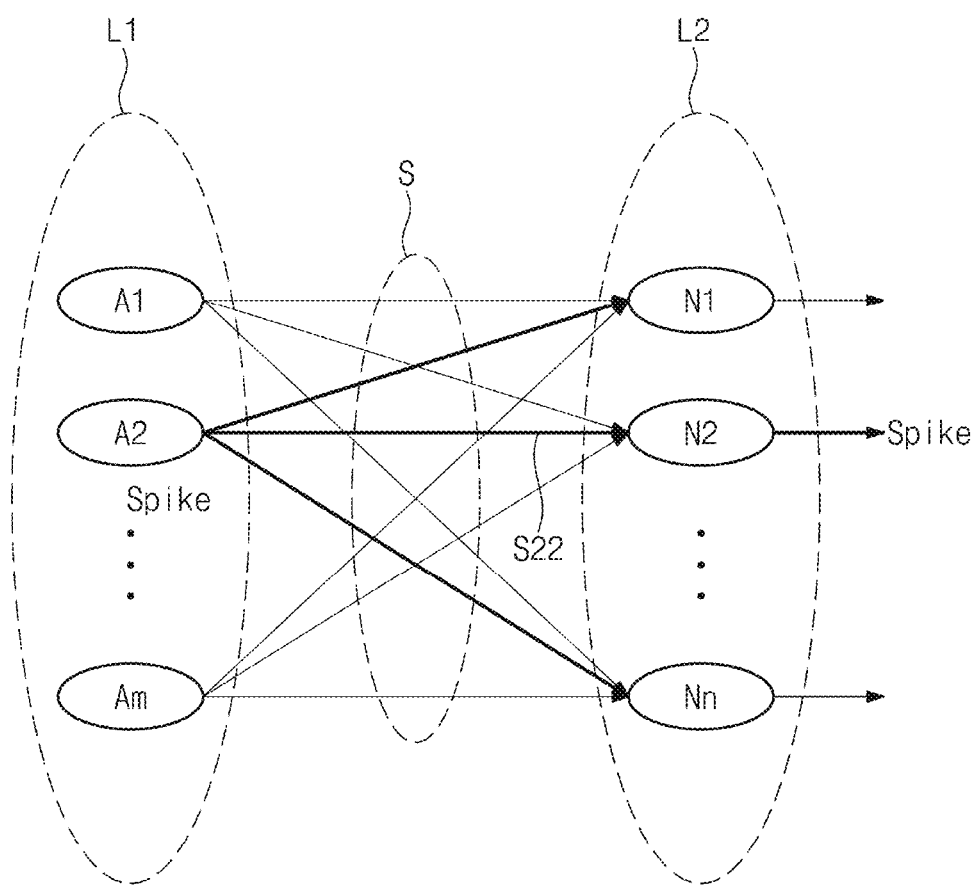
FIG. 1 is a diagram illustrating an example of a neural network according to an embodiment of the inventive concepts.

FIG. 1 is a diagram illustrating an example of a neural network according to an embodiment of the inventive concepts. Referring to FIG. 1, a neural network may include presynaptic neurons A1 to Am, postsynaptic neurons N1 to Nn, and synapses "S". The synapses "S" may connect the presynaptic neurons A1 to Am and the postsynaptic neurons N1 to Nn. The presynaptic neurons A1 to Am may be included in a first layer L1 of the neural network, and the postsynaptic neurons N1 to Nn may be included in a second layer L2 of the neural network. The first layer L1 may include the "m" presynaptic neurons A1 to Am, and the second layer L2 may include the "n" postsynaptic neurons N1 to Nn. Here, "m" and "n" may be any natural number, and "m" and "n" may be different numbers or the same number.

Each of the presynaptic neurons A1 to Am of the first layer L1 may output a spike. The synapses "S" may transfer signals to the postsynaptic neurons N1 to Nn of the second layer L2 based on the output spike. Even though a spike is output from one presynaptic neuron, each of the signals that are transferred from the synapses "S" to the neurons N1 to Nn may vary with a synaptic weight being the connection strength of each of the synapses "S". For example, in the case where a synaptic weight of a first synapse is greater than a synaptic weight of a second synapse, a postsynaptic neuron connected with the first synapse may receive a signal of a greater value than a postsynaptic neuron connected with the second synapse.

The postsynaptic neurons N1 to Nn of the second layer L2 may receive signals transferred from the synapses "S" and may output a spike based on the received signals. In an embodiment, when a value of accumulating received signals is greater than a threshold value, each of the postsynaptic neurons N1 to Nn may output a spike.

For example, as illustrated in FIG. 1, in the case where the second presynaptic neuron A2 outputs a spike, the synapses "S" connected with the second presynaptic neuron A2 may transfer signals to the postsynaptic neurons N1 to Nn. The transferred signals may vary with synaptic weights of the synapses "S" connected with the second presynaptic neuron A2. A signal may be transferred to the second postsynaptic neuron N2 from a synapse S22 connecting the second presynaptic neuron A2 and the second postsynaptic neuron N2; in the case where an accumulated signal value of the second postsynaptic neuron N2 becomes greater than the threshold value by the transferred signal, the second postsynaptic neuron N2 may output a spike.

As described above, a presynaptic neuron may mean a neuron that outputs a spike to transfer a signal to a neuron of a next layer, and a postsynaptic neuron may mean a neuron that receives a signal according to a spike of a neuron of a previous layer. That is, one neuron may perform a role of both a presynaptic neuron and a postsynaptic neuron.

An example is illustrated in FIG. 1 as the neural network includes the first layer L1 and the second layer L2, but the inventive concepts is not limited thereto. For example, the number of layers included in the neural network may be variously changed. Regardless of the number of layers, each layer may operate in a manner that is similar to the manner described with reference to FIG. 1. Accordingly, the neural network of FIG. 1 may be expanded to a neural network of various layers.

Figure 2:
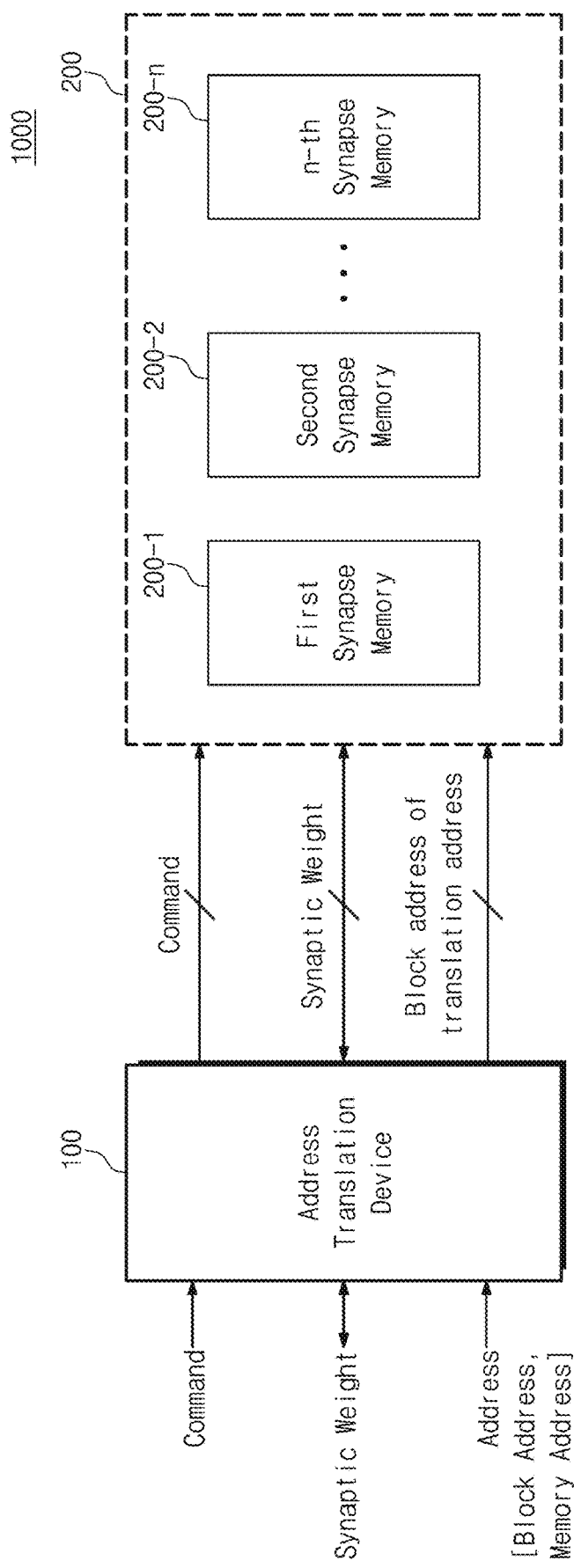
FIG. 2 is a block diagram illustrating a neuromorphic system according to an embodiment of the inventive concepts.

FIG. 2 is a block diagram illustrating a neuromorphic system according to an embodiment of the inventive concepts. Referring to FIG. 2, a neuromorphic system 1000 may include an address translation device 100 and a plurality of synapse memories 200. The neuromorphic system 1000 may operate based on the neural network of FIG. 1. First to n-th synapse memories 200-1 to 200-*n* may correspond to the postsynaptic neurons N1 to Nn of FIG. 1, respectively. However, the inventive concept is not limited thereto. For example, the number of synapse memories included in the neuromorphic system 1000 may be variously changed.

The address translation device 100 may receive an address for a synaptic weight between a presynaptic neuron and a postsynaptic neuron and may translate the received address into a translation address. The address for the synaptic weight may indicate an address of a memory targeted for a read operation or a write operation of the synaptic weight from among the plurality of synapse memories 200. In the case where an address is translated by the address translation device 100, an address of a memory targeted for an operation of reading or writing a synaptic weight may change. That is, a synapse memory indicated by the address may be different from a synapse memory indicated by the translation address. For example, the received address may indicate the first synapse memory 200-1, and the translation address may indicate the second synapse memory 200-2.

The address translation device 100 may receive a command and may operate in response to the command. For example, in response to a write command, the address translation device 100 may provide a synaptic weight to a synapse memory corresponding to the translation address from among the plurality of synapse memories 200. In response to a read command, the address translation device 100 may output a stored synaptic weight from a synapse memory corresponding to the translation address from among the plurality of synapse memories 200.

In an embodiment, the address translation device 100 may generate a translation address such that at least two of synaptic weights corresponding to each of postsynaptic neurons are stored in different synapse memories from among the plurality of synapse memories 200. For example, the number of synaptic weights corresponding to the first postsynaptic neuron N1 of FIG. 1 may be equal to the number of the presynaptic neurons A1 to Am, that is, "m". In the case where all addresses corresponding to the "m" synaptic weights indicate the same synapse memory, the address translation device 100 may generate a translation address such that at least two of the "m" addresses indicate different synapse memories.

For example, in the case where the number "n" of the first to n-th synapse memories 200-1 to 200-n is equal to or greater than the number (i.e. "m") of synaptic weights corresponding to each of the postsynaptic neurons N1 to Nn of FIG. 1 (i.e., in the case where "n" being "m" or more), the address translation device 100 may translate an address such that all addresses corresponding to the "m" synaptic weights indicate different synapse memories. That is, all synaptic weights corresponding to a specific postsynaptic neuron may be stored in different synapse memories based on a translation address.

Also, the address translation device 100 may generate a translation address such that at least two of synaptic weights corresponding to each of presynaptic neurons are stored in different synapse memories from among the plurality of synapse memories 200. For example, the number of synaptic weights corresponding to the first presynaptic neuron A1 of FIG. 1 may be equal to the number of the postsynaptic neurons N1 to Nn, that is, "n". In the case where all addresses corresponding to the "n" synaptic weights indicate the same synapse memory, the address translation device 100 may generate a translation address such that at least two of the "n" addresses indicate different synapse memories.

That is, the address translation device 100 may generate a translation address such that synaptic weights corresponding to a specific postsynaptic neuron or a specific presynaptic neuron are distributed into different synapse memories in a write operation.

The plurality of synapse memories 200 may operate based on a translation address generated from the address translation device 100. The address translation device 100 may provide a command to a synapse memory corresponding to the translation address from among the plurality of synapse memories 200. The synapse memory that is provided with the command may operate in response to the command. For example, in the case where a write command is provided to the first synapse memory 200-1, the first synapse memory 200-1 may store a synaptic weight in response to the write command. In the case where a read command is provided to the second synapse memory 200-2, the second synapse memory 200-2 may output a synaptic weight in response to the read command.

Each of the plurality of synapse memories 200 may be implemented with one of a volatile memory device, such as a static RAM (SRAM), a dynamic RAM (DRAM), or a synchronous DRAM (SDRAM), and a nonvolatile memory device, such as a read only memory (ROM), a programmable ROM (PROM), an electrically programmable ROM (EPROM), an electrically erasable and programmable ROM (EEPROM), a phase-change RAM (PRAM), a magnetic RAM (MRAM), a resistive RAM (RRAM), a ferroelectric RAM (FRAM), or a flash memory.

Each of the plurality of synapse memories 200 may be implemented with a separate memory device and may operate individually. For example, each of the first synapse memory 200-1 and the second synapse memory 200-2 may include a separate peripheral circuit and may store or output a synaptic weight by using the peripheral circuit. However, the inventive concepts is not limited thereto. For example, the plurality of synapse memories 200 may be implemented with one package or one memory chip and may store or output a synaptic weight by using one peripheral circuit.

The address provided to the address translation device 100 may include a block address and a memory address. The memory address may be an address indicating a synapse memory, which will store or output a synaptic weight, from among the plurality of synapse memories 200. The block address may indicate a memory block, which will store or output a synaptic weight, from among a plurality of memory blocks of a synapse memory corresponding to the memory address. A memory block of a synapse memory may include at least one memory cell that may store a synaptic weight.

The address translation device 100 may generate a translation address by translating values of a block address and a memory address. The generated translation address may include a translated block address and a translated memory address. In an embodiment, the address translation device 100 may translate only some addresses of provided addresses to generate translation addresses. As such, a block address and a memory address of each of the addresses not being translated may be equal to a block address and a memory address of each of translation addresses. The address translation device 100 may generate a translation address by translating a value of one of a block address and a memory address of an address. For example, the address translation device 100 may generate a translation address by translating only a value of a memory address of an address. Alternatively, the address translation device 100 may generate a translation address by translating values of both a block address and a memory address of an address.

That is, the address translation device 100 may translate values of a block address and a memory address of an address such that synaptic weights corresponding to a specific postsynaptic neuron or a specific presynaptic neuron are distributed into different synapse memories in a write operation.

The address translation device 100 may provide a block address of a translation address to the plurality of synapse memories 200. In the case where a synapse memory, which will store or output a synaptic weight, from among the address translation device 200 is determined based on a memory address of a translation address, the address translation device 100 may provide a block address to the determined synapse memory. The synapse memory that receives the block address may store the synaptic weight in a memory block or may output the synaptic weight from the memory block.

In an operation of writing a synaptic weight, the address translation device 100 may provide a synaptic weight and a block address to each of the plurality of synapse memories 200. The address translation device 100 may provide a synaptic weight and a block address corresponding to the synaptic weight to one of the plurality of synapse memories 200 through an individual signal line. In an operation of reading a synaptic weight, the address translation device 100 may provide a block address to one of the plurality of synapse memories 200 through an individual signal line.

In the case where the address translation device 100 accesses the plurality of synapse memories 200 through individual signal lines, the address translation device 100 may provide synaptic weights and block addresses to the plurality of synapse memories 200 at the same time. Based on the provided block addresses, the plurality of synapse memories 200 may store the synaptic weights at the same time or may output the synaptic weights at the same time. Accordingly, a speed at which the plurality of synapse memories 200 are accessed may be improved.

Figure 3:
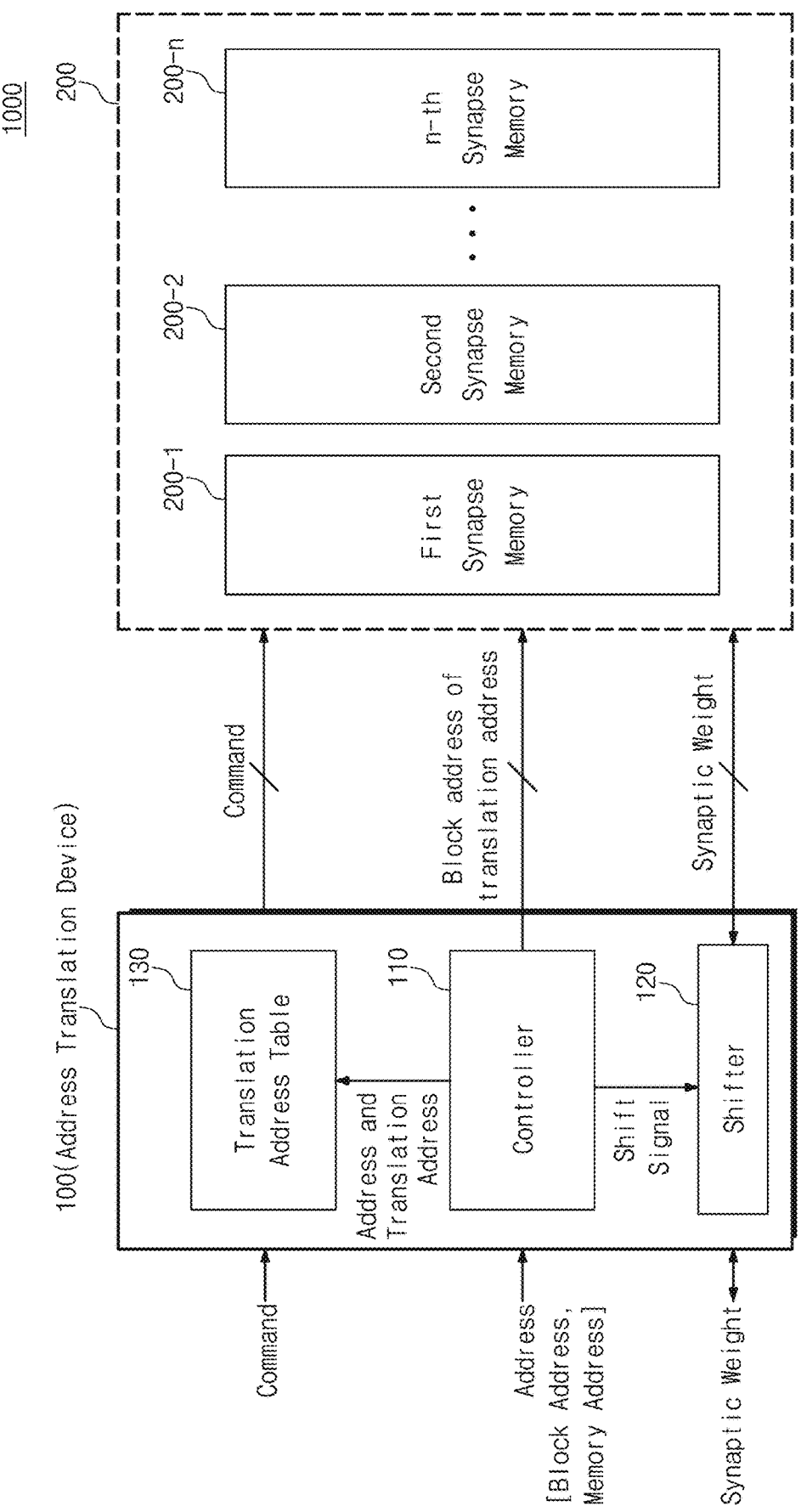
FIG. 3 is a block diagram illustrating an example of an address translation device of FIG. 2.

FIG. 3 is a block diagram illustrating an example of an address translation device of FIG. 2. Referring to FIG. 3, the neuromorphic system 1000 may include the address translation device 100 and the plurality of synapse memories 200. The address translation device 100 may include a controller 110, a shifter 120, and a translation address table 130.

The controller 110 may generate a translation address from a provided address in response to a command. In an embodiment, the controller 110 may generate a translation address in compliance with a given translation rule. The given translation rule may be one of the following rules: a rule that allows at least two of synaptic weights corresponding to each of the postsynaptic neurons N1 to Nn of FIG. 1 to be stored in different synapse memories from among the plurality of synapse memories 200 and a rule that allows at least two of synaptic weights corresponding to each of the presynaptic neurons A1 to Am of FIG. 1 to be stored in different synapse memories from among the plurality of synapse memories 200. The given translation rule will be more fully described with reference to FIG. 5.

The controller 110 may store an address and a generated translation address in the translation address table 130. In an embodiment, the controller 110 may generate a translation address from a provided address in response to a write command and may store the address and the translation address in the translation address table 130 in a 1:1 correspondence. Afterwards, the controller 110 may obtain a translation address from the translation address table 130 in response to a read command. That is, the controller 110 may store a translation address generated in compliance with a given translation rule in a write operation and may use the stored translation address in a read operation. However, the inventive concepts is not limited thereto. For example, in an operation of writing a synaptic weight, in the case where a translation address corresponding to a provided address is present in the translation address table 130, the controller 110 may obtain the translation address from the translation address table 130. Alternatively, in an operation of reading a synaptic weight, the controller 110 may generate a translation address in compliance with a given rule without using the translation address table 130.

The controller 110 may generate a shift signal based on a memory address of a translation address and a transfer order of an address. The controller 110 may provide the generated shift signal to the shifter 120. The shift signal may be a control signal for transferring a synaptic weight to a synapse memory corresponding to a memory address of a translation address from among the plurality of synapse memories 200. That is, a synaptic weight may be provided to one of the plurality of synapse memories 200 based on the shift signal.

The shifter 120 may reorder (or rearrange) synaptic weights based on the shift signal. In the case where a plurality of synaptic weights are provided to the shifter 120, the shifter 120 may differently set output positions of the synaptic weights or an order in which the synaptic weights are output. In an embodiment, in an operation of writing a synaptic weight, the shifter 120 may reorder output positions of synaptic weights such that each synaptic weight is transferred to a synapse memory corresponding to a memory address of a translation address. The shifter 120 may provide a reordered synaptic weight to a synapse memory through a signal line connected with each of the plurality of synapse memories 200. In an operation of reading a synaptic weight, the shifter 120 may reorder synaptic weights provided from the plurality of synapse memories 200 such that a synaptic weight may be output in a transfer order of an address. The shifter 120 may output a synaptic weight to the outside of the address translation device 100 based on the order of reordered synaptic weights.

For example, the shifter 120 may be a barrel shifter. However, the inventive concepts is not limited thereto. For example, the shifter 120 may be implemented with various kinds of shifters.

In an embodiment, in an operation of writing a synaptic weight, the shifter 120 may provide each of reordered synaptic weights to a corresponding synapse memory. In the case where a plurality of synaptic weights are transferred to different synapse memories, the shifter 120 may provide the plurality of synaptic weights to synapse memories at the same time. In an operation of reading a synaptic weight, in the case where synaptic weights are output from different synapse memories, the shifter 120 may receive the synaptic weights from the different synapse memories simultaneously and respectively. The shifter 120 may reorder received synaptic weights such that the received synaptic weights are output in a transfer order of an address. The reordered synaptic weights may be provided to the outside of the address translation device 100 in a transfer order of an address.

The translation address table 130 may store an address provided from the controller 110 and a translation address in a 1:1 correspondence. As illustrated in FIG. 3, the translation address table 130 may be implemented outside the controller 110, but the inventive concepts is not limited thereto. For example, the translation address table 130 may be present in an internal memory (not illustrated) of the controller 110.

As described above, the neuromorphic system 1000 according to embodiments of the inventive concepts may manage a synaptic weight based on a translation address. The neuromorphic system 1000 may reorder output positions of the synaptic weights or the order of outputting synaptic weights, in consideration of the fact that a synapse memory that stores or outputs a synaptic weight changes with a translation address. For example, in the case where an address for a read operation is provided from the outside (i.e. a host) of the address translation device 100, the neuromorphic system 1000 may reorder synaptic weights and may provide the reordered synaptic weights to the host in a transfer order of an address. As such, the neuromorphic system 1000 may manage a synaptic weight based on a translation address, without changing an address management system of the host.

Figure 4:
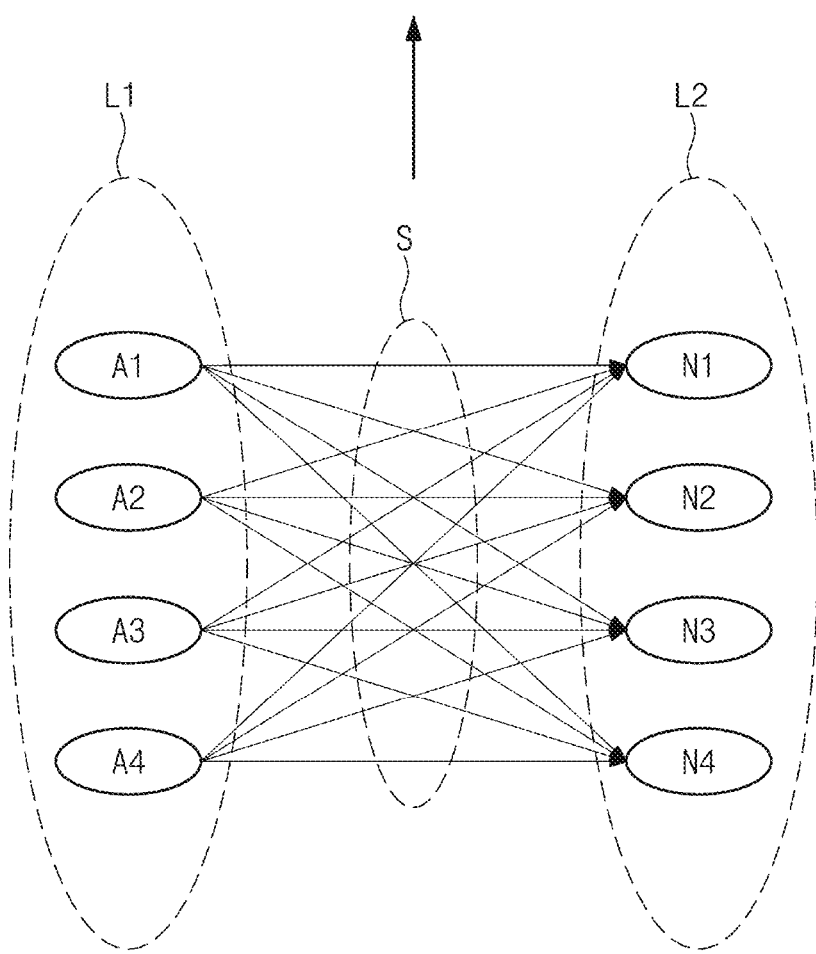
FIG. 4 is a diagram illustrating an example of a neural network of FIG. 1.

FIG. 4 is a diagram illustrating an example of a neural network of FIG. 1. Referring to FIG. 4, a neural network may include the first layer L1, the second layer L2, and the synapses "S". The first layer L1 may include first to fourth presynaptic neurons A1 to A4, and the second layer L2 may include first to fourth postsynaptic neurons N1 to N4. The synapses "S" may connect the first to fourth presynaptic neurons A1 to A4 of the first layer L1 and the first to fourth postsynaptic neurons N1 to N4 of the second layer L2.

The number of synapses "S" connecting the first to fourth presynaptic neurons A1 to A4 and the first to fourth postsynaptic neurons N1 to N4 may be "16". As illustrated in FIG. 4, synaptic weights w1 to w16 corresponding to the synapses "S" may be expressed by a weight matrix "W".

The weights w1 to w4 at the first row of the weight matrix "W" may correspond to synapses connecting the first presynaptic neuron A1 and the postsynaptic neurons N1 to N4. For example, a synaptic weight corresponding to a synapse connecting the first presynaptic neuron and the first postsynaptic neuron N1 may be "w1". Likewise, the weights w5 to w8 at the second row of the weight matrix "W" may correspond to the second presynaptic neuron A2, the weights w9 to w12 at the third row may correspond to the third presynaptic neuron A3, and the weights w13 to w16 at the fourth row may correspond to the fourth presynaptic neuron A4.

The weights w1, w5, w9, and w13 at the first column of the weight matrix "W" may correspond to synapses connecting the presynaptic neurons A1 to A4 and the first postsynaptic neuron N1. For example, a synaptic weight corresponding to a synapse connecting the second presynaptic neuron A2 and the first postsynaptic neuron N1 may be "w5". Likewise, the weights w2, w6, w10, and w14 at the second column of the weight matrix "W" may correspond to the second postsynaptic neuron N2, the weights w3, w7, w11, and w15 at the third column may correspond to the third postsynaptic neuron N3, and the weights w4, w8, w12, and w16 at the fourth column may correspond to the fourth postsynaptic neuron N4.

As illustrated in FIG. 4, synaptic weights between four presynaptic neurons A1 to A4 and four postsynaptic neurons N1 to N4 may be expressed by a 4×4 weight matrix "W". That is, synaptic weights between "M" presynaptic neurons and "N" postsynaptic neurons may be expressed by an M×N weight matrix.

Below, an operation of the neuromorphic system 1000 of FIG. 3 will be more fully described with reference to the neural network of FIG. 4. That is, an operation of the neuromorphic system 1000 will be described based on the synaptic weights w1 to w16 that are expressed by the 4×4 weight matrix "W". However, the inventive concept is not limited thereto. For example, the neuromorphic system 1000 may operate based on synaptic weights that are expressed by a weight matrix of various sizes.

Figure 5:
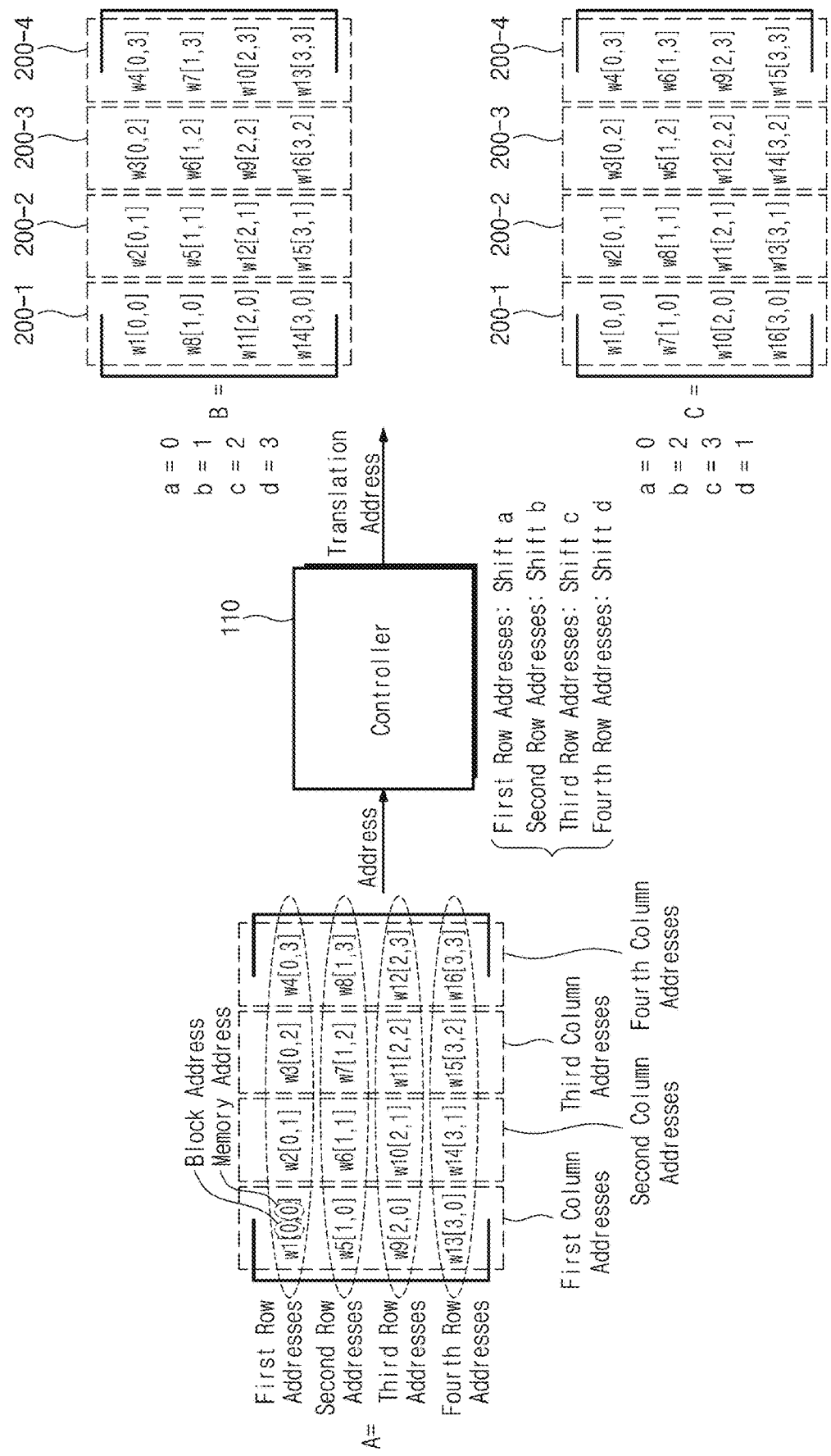
FIG. 5 is a block diagram illustrating an example of an operation of a controller of FIG. 3.

FIG. 5 is a block diagram illustrating an example of an operation of a controller of FIG. 3. Referring to FIG. 5, the controller 110 may generate a translation address from an address. As illustrated in FIG. 5, addresses that are provided to the controller 110 may be expressed by an address matrix "A". The address matrix "A" may include addresses respectively corresponding to the synaptic weights w1 to w16 of FIG. 4. Each address may include a block address and a memory address. For example, an address corresponding to the synaptic weight w1 may be [0, 0]. That is, a block address of the synaptic weight w1 may be "0" and a memory address thereof may be "0". The block address of "0" may indicate a first memory block of a synapse memory, and the memory address of "0" may indicate the first synapse memory 200-1 of FIG. 3. That is, the address [0, 0] may indicate the first memory block of the first synapse memory 200-1.

For example, first row addresses [0, 0], [0, 1], [0, 2], and [0, 3] of the address matrix "A" may correspond to the synaptic weights w1, w2, w3, and w4 corresponding to the first presynaptic neuron A1 and may indicate first memory blocks of first to fourth synapse memories 200-1 to 200-4. First column addresses [0, 0], [1, 0], [2, 0], and [3, 0] of the address matrix "A" may correspond to the synaptic weights w1, w5, w9, and w13 corresponding to the first postsynaptic neuron N1 and may indicate first to fourth memory blocks of the first synapse memory 200-1. As such, addresses that are provided to the controller 110 may indicate addresses that allow synaptic weights corresponding to a specific presynaptic neuron to be stored in different synapse memories and that synaptic weights corresponding to a specific postsynaptic neuron to be stored in the same synapse memory.

The controller 110 may translate an address in compliance with a given translation rule. For example, the controller 110 may shift a memory address of a first row address of the address matrix "A" as much as "a", may shift a memory address of a second row address of the address matrix "A" as much as "b", may shift a memory address of a third row address of the address matrix "A" as much as "c", and may shift a memory address of a fourth row address of the address matrix "A" as much as "d". Here, "a", "b", "c", and "d" may be an integer that is less than the number of synapse memories and is 0 or more, and at least two of "a", "b", "c", and "d" may be different numbers. For example, in the case where the neuromorphic system 1000 includes the first to fourth synapse memories 200-1 to 200-4, each of "a", "b", "c", and "d" may be one of "0" to "3".

As illustrated in FIG. 5, in the case where "a" is 0, "b" is 1, "c" is 2, and "d" is 3, the controller 110 may generate addresses of the address matrix "B" from addresses of the address matrix "A". Because "a" is 0, the controller 110 may not shift memory addresses of the first row addresses in the address matrix "A". That is, addresses of the synaptic weights w1, w2, w3, and w4 may be equal to translation addresses. Because "b" is 1, the controller 110 may respectively shift memory addresses of the second row addresses in the address matrix "A" as much as "1". As such, a translation address corresponding to the synaptic weight w5 may be [1, 1], a translation address corresponding to the synaptic weight w6 may be [1, 2], a translation address corresponding to the synaptic weight w7 may be [1, 3], and a translation address corresponding to the synaptic weight w8 may be [1, 0]. Memory addresses of the third row addresses of the address matrix "A" may be shifted as much as "2", and memory addresses of the fourth row addresses of the address matrix "A" may be shifted as much as "3". In the case where a translation address is generated according to the above description, translation addresses of synaptic weights respectively corresponding to the first to fourth postsynaptic neurons N1 to N4 may indicate different synapse memories. Also, translation addresses of synaptic weights corresponding to each of the first to fourth presynaptic neurons A1 to A4 may indicate different synapse memories.

That is, synaptic weights corresponding to a specific postsynaptic neuron and synaptic weights corresponding to a specific presynaptic neuron may be stored in different synapse memories. For example, the synaptic weights w1, w5, w9, and w13 corresponding to the first postsynaptic neuron N1 may be distributed into the first to fourth synapse memories 200-1 to 200-4, and the synaptic weights w1 to w4 corresponding to the first presynaptic neuron A1 may be distributed into the first to fourth synapse memories 200-1 to 200-4.

As illustrated in FIG. 5, in the case where "a" is 0, "b" is 2, "c" is 3, and "d" is 1, the controller 110 may generate addresses of an address matrix "C" from addresses of the address matrix "A". Because "a" is 0, the controller 110 may not shift memory addresses of the first row addresses in the address matrix "A". That is, addresses of the synaptic weights w1, w2, w3, and w4 may be equal to translation addresses. Because "b" is 2, the controller 110 may respectively shift memory addresses of the second row addresses in the address matrix "A" as much as "2". In this case, translation addresses corresponding to the synaptic weights w5, w6, w7, and w8 may be [1, 2], [1, 3], [1, 0], and [1, 1]. Memory addresses of the third row addresses of the address matrix "A" may be shifted as much as "3", and memory addresses of the fourth row addresses of the address matrix "A" may be shifted as much as "1". In the case where a translation address is generated according to the above description, translation addresses of synaptic weights corresponding to the first to fourth postsynaptic neurons N1 to N4 may indicate different synapse memories. Also, translation addresses of synaptic weights corresponding to the first to fourth presynaptic neurons A1 to A4 may indicate different synapse memories.

As such, in the case where "a" to "d" are set to different numbers between "0" to "3", translation addresses of synaptic weights respectively corresponding to the first to fourth postsynaptic neurons N1 to N4 and translation addresses of synaptic weights corresponding to each of the first to fourth presynaptic neurons A1 to A4 may indicate different synapse memories. That is, in the case where synaptic weights are stored based on translation addresses, the synaptic weights respectively corresponding to the first to fourth postsynaptic neurons N1 to N4 and the synaptic weights corresponding to each of the first to fourth presynaptic neurons A1 to A4 may be stored in different synapse memories.

An example is described with reference to FIG. 5 as a translation address is generated by translating a memory address of an address. However, the inventive concepts is not limited thereto. For example, in the case where the number (e.g., 3) of synapse memories is less than the number (e.g., 4) of synaptic weights corresponding to a specific presynaptic neuron, a translation address may be generated by translating a block address of an address as well as a memory address of the address.

As illustrated in FIG. 5, the controller 110 may perform an address translation operation in an operation of writing a synaptic weight, but the inventive concepts is not limited thereto. For example, the controller 110 may translate addresses provided in an operation of reading a synaptic weight. In this case, a translation address for a write operation and a translation address for a read operation may be generated in compliance with the same translation rule.

Below, for convenience of description, a write operation and a read operation of the neuromorphic system 1000 of FIG. 3 will be more fully described with reference to the translation addresses of the address matrix "B".

Figure 6:
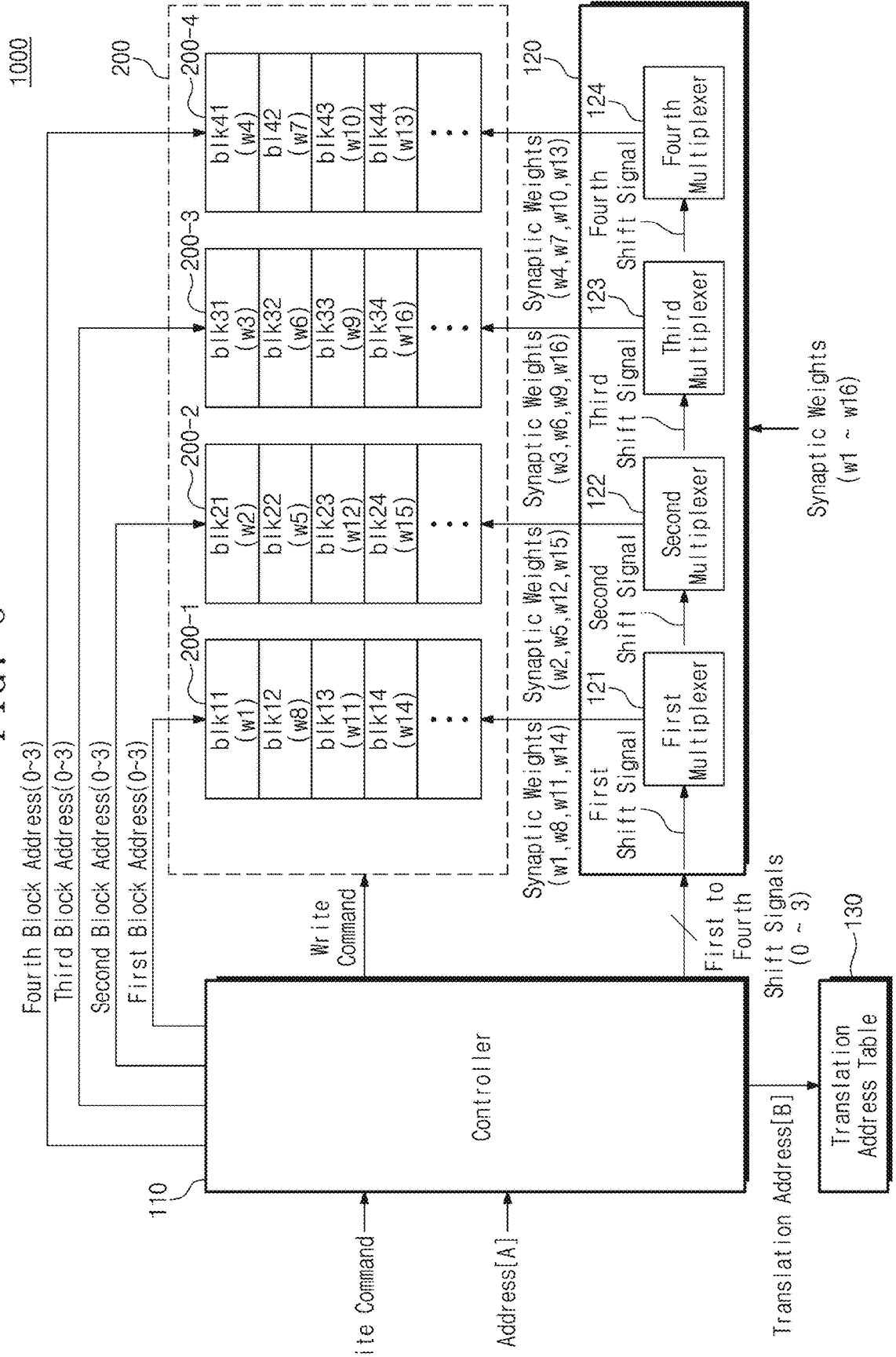
FIG. 6 is a diagram illustrating an example of a write operation of a neuromorphic system of FIG. 3.

FIG. 6 is a diagram illustrating an example of a write operation of a neuromorphic system of FIG. 3. Referring to FIG. 6, the neuromorphic system 1000 may include the controller 110, the shifter 120, the translation address table 130, and the plurality of synapse memories 200. The neuromorphic system 1000 may include the first to fourth synapse memories 200-1 to 200-4 as the plurality of synapse memories 200.

The neuromorphic system 1000 may store the 16 synaptic weights w1 to w16 in the first to fourth synapse memories 200-1 to 200-4 based on translation addresses of the address matrix "B" generated from the addresses of the address matrix "A" of FIG. 5. The neuromorphic system 1000 may classify the 16 synaptic weights w1 to w16 into four weight groups based on the number of the synapse memories 200-1 to 200-4 and may store 4 synaptic weights belonging to each weight group in different synapse memories. For example, the neuromorphic system 1000 may classify the 16 synaptic weights w1 to w16 into a weight group of the synaptic weights w1 to w4, a weight group of the synaptic weights w5 to w8, a weight group of the synaptic weights w9 to w12, and a weight group of the synaptic weights w13 to w16. As illustrated in FIG. 6, synaptic weights of each weight group classified may be stored in different synapse memories, respectively.

The controller 110 may receive a write command and the addresses of the address matrix "A". The controller 110 may generate translation addresses from the received addresses in response to the write command. The controller 110 may generate translation addresses of the address matrix "B", as illustrated in FIG. 5. The generated translation addresses may be stored in the translation address table 130.

The controller 110 may determine a synapse memory, in which a synaptic weight will be stored, based on a memory address of a translation address, and may provide a block address of the translation address to the synapse memory determined. For example, the controller 110 may determine the second synapse memory 200-2 as a synapse memory in which the synaptic weight w2 will be stored, based on a memory address "1" of the translation address [0, 1] associated with the synaptic weight w2. The controller 110 may provide the block address "0" of the translation address [0, 1] to the second synapse memory 200-2. That is, in the case where the block address of "0" is provided to the second synapse memory 200-2, the block address of "0" may indicate a first memory block blk21.

As illustrated in FIG. 6, the controller 110 may provide first to fourth block addresses respectively corresponding to the first to fourth synapse memories 200-1 to 200-4, for the purpose of storing the four synaptic weights classified in different synapse memories. Each of the first to fourth block addresses may be provided to a corresponding synapse memory of the first to fourth synapse memories 200-1 to 200-4. For example, the controller 110 may generate the first to fourth block addresses for the purpose of storing the four synaptic weights w1 to w4. The controller 110 may provide the first, second, third, and fourth block addresses of "0", "0", "0", and "0" based on the translation addresses [0, 0], [0, 1], [0, 2], and [0, 3] of the synaptic weights w1 to w4. As such, the synaptic weights w1 to w4 may be respectively stored in the first memory blocks blk11, blk21, blk31, and blk41 of the corresponding synapse memory.

A value of each block address provided from the controller 110 based on translation addresses of the address matrix "B" of FIG. 5 may be one of "0" to "3", but the inventive concepts is not limited thereto. For example, a value of a block address may vary with the number of synaptic weights or values of translation addresses.

The controller 110 may generate a shift signal based on a memory address of a translation address and a transfer order of an address and may provide the shift signal to the shifter 120. Shifter 120 may provide a synaptic weight to a synapse memory based on the shift signal. As illustrated in FIG. 6, the controller 110 may generate the first to fourth shift signals for the purpose of storing four synaptic weights in different synapse memories. For example, the controller 110 may generate the second shift signal having a value of "0" based on the memory address "1" of the translation address [0, 1] and a transfer order "2" of the address [0, 1]. The controller 110 may generate the third shift signal having a value of "1" based on the memory address "2" of the translation address [1, 2] and the transfer order "6" of the address [1, 1].

In an embodiment, the controller 110 may generate the same shift signal with respect to synaptic weights corresponding to each of presynaptic neurons and may generate different shift signals with respect to synaptic weights respectively corresponding to different presynaptic neurons. For example, the controller 110 may generate the first to fourth shift signals as the same shift signal having a value of "0" with respect to the synaptic weights w1 to w4 corresponding to the first presynaptic neuron A1 of FIG. 4. The controller 110 may generate a shift signal (e.g., "1") for the synaptic weights w5 to w8 corresponding to the second presynaptic neuron A2. That is, the shift signal (e.g., "0") corresponding to the first presynaptic neuron A1 is different from the shift signal (e.g., "1") corresponding to the second presynaptic neuron A2.

The shifter 120 may include first to fourth multiplexers 121 to 124. The first to fourth multiplexers 121 to 124 may correspond to the first to fourth synapse memories 200-1 to 200-4, respectively. The shifter 120 may receive the first to fourth shift signals from the controller 110. The first to fourth multiplexers 121 to 124 may operate based on the first to fourth shift signals. For example, the first multiplexer 121 may operate in response to the first shift signal.

Each of the first to fourth multiplexers 121 to 124 may provide one of four synaptic weights to the corresponding synapse memory based on a shift signal. For example, as illustrated in FIG. 6, the first multiplexer 121 may transfer the synaptic weights w1 of the four synaptic weights w1, w2, w3, and w4 to the first synapse memory 200-1 in response to the first shift signal. The second multiplexer 122 may transfer the synaptic weights w2 of the four synaptic weights w1, w2, w3, and w4 to the second synapse memory 200-2 in response to the second shift signal. Likewise, the third and fourth multiplexers 123 and 124 may operate based on the third and fourth shift signals.

In the unit of a weight group including four synaptic weights, the shifter 120 may transfer the 16 synaptic weights w1 to w16 to the first to fourth synapse memories 200-1 to 200-4 in response to the first to fourth shift signals. For example, the shifter 120 may transfer the four synaptic weights w1 to w4 to the first to fourth synapse memories 200-1 to 200-4 at the same time in response to the first to fourth shift signals. In the case where the above operation of the shifter 120 is repeated, the shifter 120 may transfer the 16 synaptic weights w1 to w16 to the first to fourth synapse memories 200-1 to 200-4 in response to the first to fourth shift signals.

The first to fourth synapse memories 200-1 to 200-4 may store the synaptic weights w1 to w16 in response to a write command. As illustrated in FIG. 6, each synapse memory may store a synaptic weight in the unit of a memory block. A memory block may be composed of a set of memory cells for storing a synaptic weight.

Each of the first to fourth synapse memories 200-1 to 200-4 may receive a block address and a synaptic weight and may store the received synaptic weight in a memory block that the block address indicates. For example, the first synapse memory 200-1 may receive the first block address of "1" and the synaptic weight w8 and may store the synaptic weight w8 in the second memory block blk12 that the first block address of "1" indicates.

Each of the first to fourth synapse memories 200-1 to 200-4 may individually operate based on a corresponding block address. Accordingly, the first to fourth synapse memories 200-1 to 200-4 may simultaneously store four synaptic weights provided from the shifter 120.

In the case where the synaptic weights w1 to w16 are stored based on the addresses of the address matrix "A" of FIG. 5, all the synaptic weights w1, w5, w9, and w13 corresponding to the first postsynaptic neuron N1 may be stored in the first synapse memory 200-1. However, according to an embodiment of the inventive concepts, in the case where the synaptic weights w1 to w16 are stored based on translation addresses of the address matrix "B" of FIG. 5, synaptic weights corresponding to a specific postsynaptic neuron may be stored in different synapse memories. For example, the synaptic weights w1, w5, w9, and w13 corresponding to the first postsynaptic neuron N1 may be stored in the first to fourth synapse memories 200-1 to 200-4.

As described above, according to an embodiment of the inventive concepts, in the case where neural network-based synaptic weights are stored, the neuromorphic system 1000 may store synaptic weights corresponding to a specific postsynaptic neuron in different synapse memories. Also, the neuromorphic system 1000 may store synaptic weights corresponding to a specific presynaptic neuron in different synapse memories. In this case, in an access operation (e.g., a read operation) associated with stored synaptic weights, the neuromorphic system 1000 may quickly access the synaptic weights.

Figure 7:
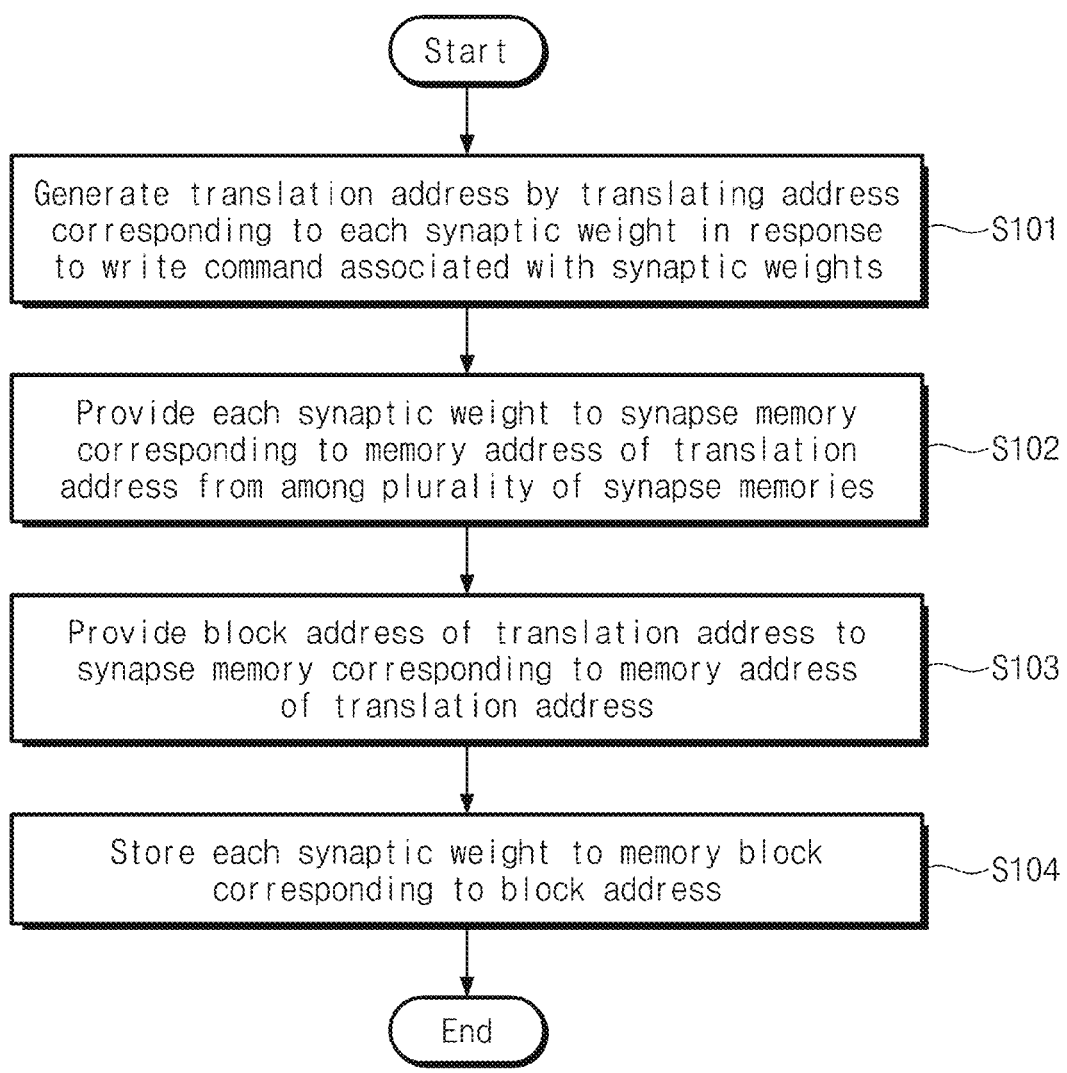
FIG. 7 is a flowchart illustrating a write operation of a neuromorphic system of FIG. 3.

FIG. 7 is a flowchart illustrating a write operation of a neuromorphic system of FIG. 3. Referring to FIGS. 3 and 7, in operation S101, the controller 110 may generate a translation address by translating an address corresponding to each of synaptic weights in response to a write command associated with the synaptic weights. In operation S102, the shifter 120 may provide each synaptic weight to a synapse memory corresponding to a memory address of the translation address from among a plurality of synapse memories. To provide each synaptic weight to a corresponding synapse memory, the controller 110 may generate a shift signal based on the memory address of the translation address and a transfer order of an address and provide the shift signal to the shifter 120. Each synaptic weight may be provided to a corresponding synapse memory based on the shift signal.

In operation S103, the controller 110 may provide a block address of the translation address to the synapse memory corresponding to the memory address of the translation address. In operation S104, each of the synapse memories 200 may store each synaptic weight from the shifter 120 to a memory block corresponding to the block address from the controller 110.

An example is illustrated in FIG. 7 as operation S103 is performed after operation S102, but the inventive concepts is not limited thereto. For example, operation S102 may be performed after operation S103.

Figure 8:
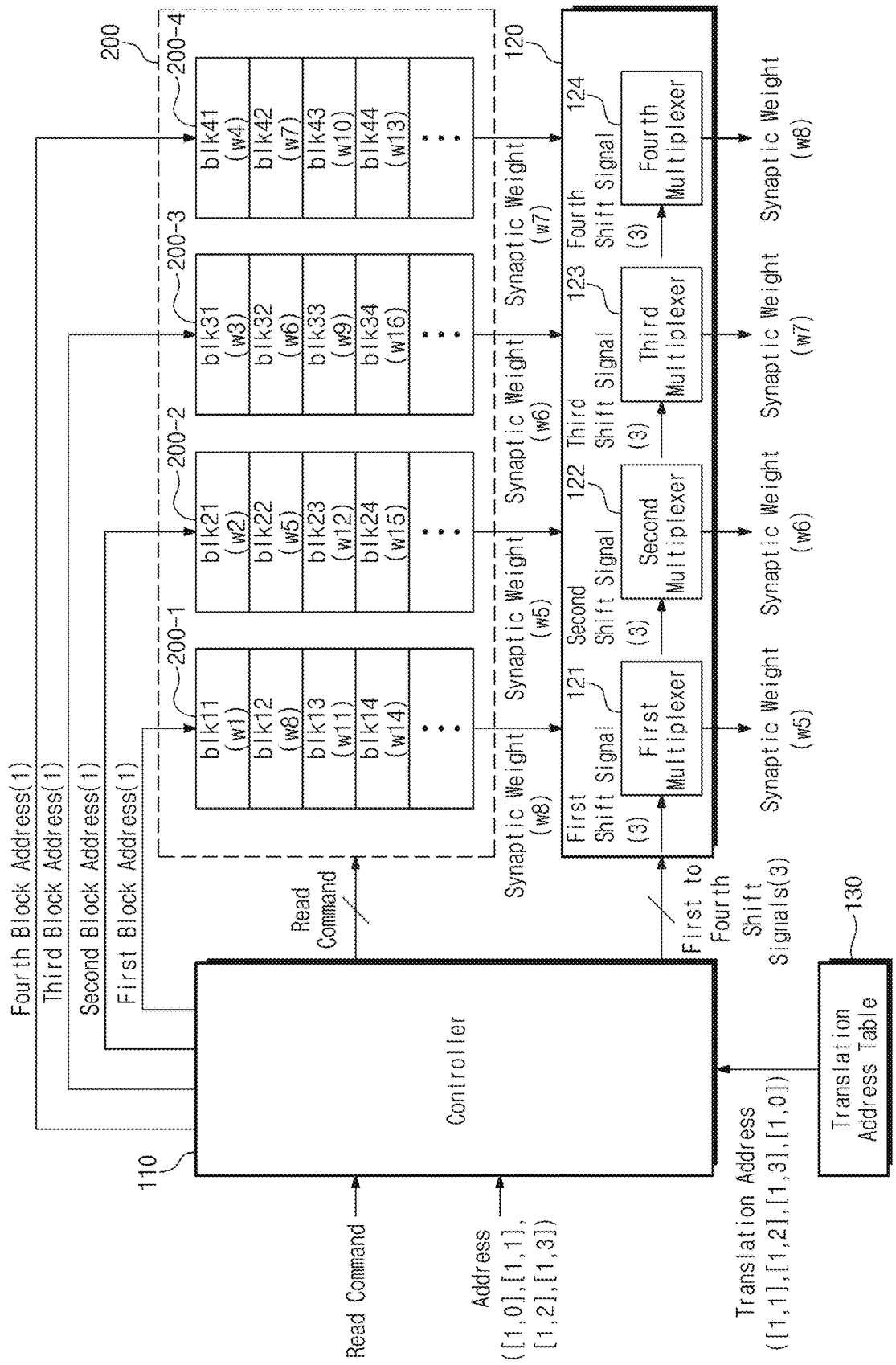
FIG. 8 is a diagram illustrating an example of a read operation of a neuromorphic system of FIG. 3.

FIG. 8 is a diagram illustrating an example of a read operation of a neuromorphic system of FIG. 3. According to a read operation of FIG. 8, the synaptic weights w5, w6, w7, and w8 corresponding to the second presynaptic neuron A2 of FIG. 4 may be output. Referring to FIG. 8, the neuromorphic system 1000 may include the controller 110, the shifter 120, the translation address table 130, and the plurality of synapse memories 200. The neuromorphic system 1000 may include the first to fourth synapse memories 200-1 to 200-4 as the plurality of synapse memories 200.

The controller 110 may receive a read command and addresses [1, 0], [1, 1], [1, 2], and [1, 3]. The addresses [1, 0], [1, 1], [1, 2], and [1, 3] may be addresses respectively corresponding to the synaptic weights w5, w6, w7, and w8 of the address matrix "A" of FIG. 5.

The controller 110 may obtain translation addresses [1, 1], [1, 2], [1, 3], and [1, 0] respectively corresponding to the addresses [1, 0], [1, 1], [1, 2], and [1, 3] from the translation address table 130. The translation addresses [1, 1], [1, 2], [1, 3], and [1, 0] may be in advance stored in the translation address table 130 in an operation of writing the synaptic weights w5, w6, w7, and w8. However, the inventive concepts is not limited thereto. For example, in a read operation, the controller 110 may translate the addresses [1, 0], [1, 1], [1, 2], and [1, 3] to generate the translation addresses [1, 1], [1, 2], [1, 3], and [1, 0].

The controller 110 may provide first to fourth block addresses to the first to fourth synapse memories 200-1 to 200-4 based on the translation addresses [1, 1], [1, 2], [1, 3], and [1, 0]. For example, the controller 110 may determine a synapse memory targeted for the read operation as the third synapse memory 200-3 based on a memory address "2" of the translation address [1, 2]. The controller 110 may provide the third block address of "1" to the third synapse memory 200-3 targeted for the read operation based on the block address "1" of the translation address [1, 2].

The first to fourth synapse memories 200-1 to 200-4 may respectively receive the first to fourth block addresses together with the read command. Each of the first to fourth synapse memories 200-1 to 200-4 may output a synaptic weight stored in a memory block that the block address indicates. For example, as illustrated in FIG. 8, the first synapse memory 200-1 may output the presynaptic weight w8 stored in the second memory block blk12 based on a value "1" that the first block address indicates.

The first to fourth synapse memories 200-1 to 200-4 may output synaptic weights at the same time based on block addresses from the controller 110. As illustrated in FIG. 8, the first, second, third, and fourth synapse memories 200-1, 200-2, 200-3, and 200-4 may simultaneously output the synaptic weights w8, w5, w6, and w7, respectively. The output synaptic weights w8, w5, w6, and w7 may correspond to the second presynaptic neuron A2 of FIG. 4.

To reorder the output synaptic weights w8, w5, w6, and w7 in a transfer order of an address (i.e., the order of synaptic weights w5, w6, w7, w8), the controller 110 may generate the first to fourth shift signals based on memory addresses of the translation addresses [1, 1], [1, 2], [1, 3], and [1, 0] and a transfer order of the addresses [1, 0], [1, 1], [1, 2], and [1, 3]. For example, the controller 110 may generate the first shift signal having a value of "3" based on the memory address "0" of the translation address [1, 0] corresponding to the first synapse memory 200-1 and a transfer order "4" of the address [1, 3] corresponding to the translation address [1, 0]. The controller 110 may generate the second shift signal having a value of "3" based on the memory address "1" of the translation address [1, 1] corresponding to the second synapse memory 200-2 and a transfer order "1" of the address [1, 0] corresponding to the translation address [1, 1].

The shifter 120 may include the first to fourth multiplexers 121 to 124. The shifter 120 may reorder an output order of the synaptic weights w8, w5, w6, and w7 output from the first to fourth synapse memories 200-1 to 200-4 by using the first to fourth multiplexers 121 to 124. As illustrated in FIG. 8, in the case where the first to fourth shift signals are provided, the shifter 120 may recorder the output order by shifting the synaptic weights w8, w5, w6, and w7 as much as "3" and may output the reordered synaptic weights w5, w6, w7, and w8.

Each of the first to fourth multiplexers 121 to 124 may operate based on the corresponding shift signal. For example, in the case where the shifter 120 is a barrel shifter, the first multiplexer 121 may transfer the synaptic weight w5 of the input synaptic weights w8, w5, w6, and w7 in response to the first shift signal having a value of "3" Likewise, the second multiplexer 122 may transfer the synaptic weight w6 of the input synaptic weights w8, w5, w6, and w7 in response to the second shift signal having a value of "3".

The description is given with reference to FIG. 8 as all values of the first to fourth shift signals are "3", but the inventive concepts is not limited thereto. For example, values of the first to fourth shift signals may be differently determined according to a kind and a structure of the shifter 120.

As described above, in the neuromorphic system 1000, the same block address may be provided to the plurality of synapse memories 200 such that synaptic weights corresponding to a specific presynaptic neuron are output at the same time. Accordingly, a speed at which synaptic weights stored in the plurality of synapse memories 200 are accessed may be improved.

Figure 9:
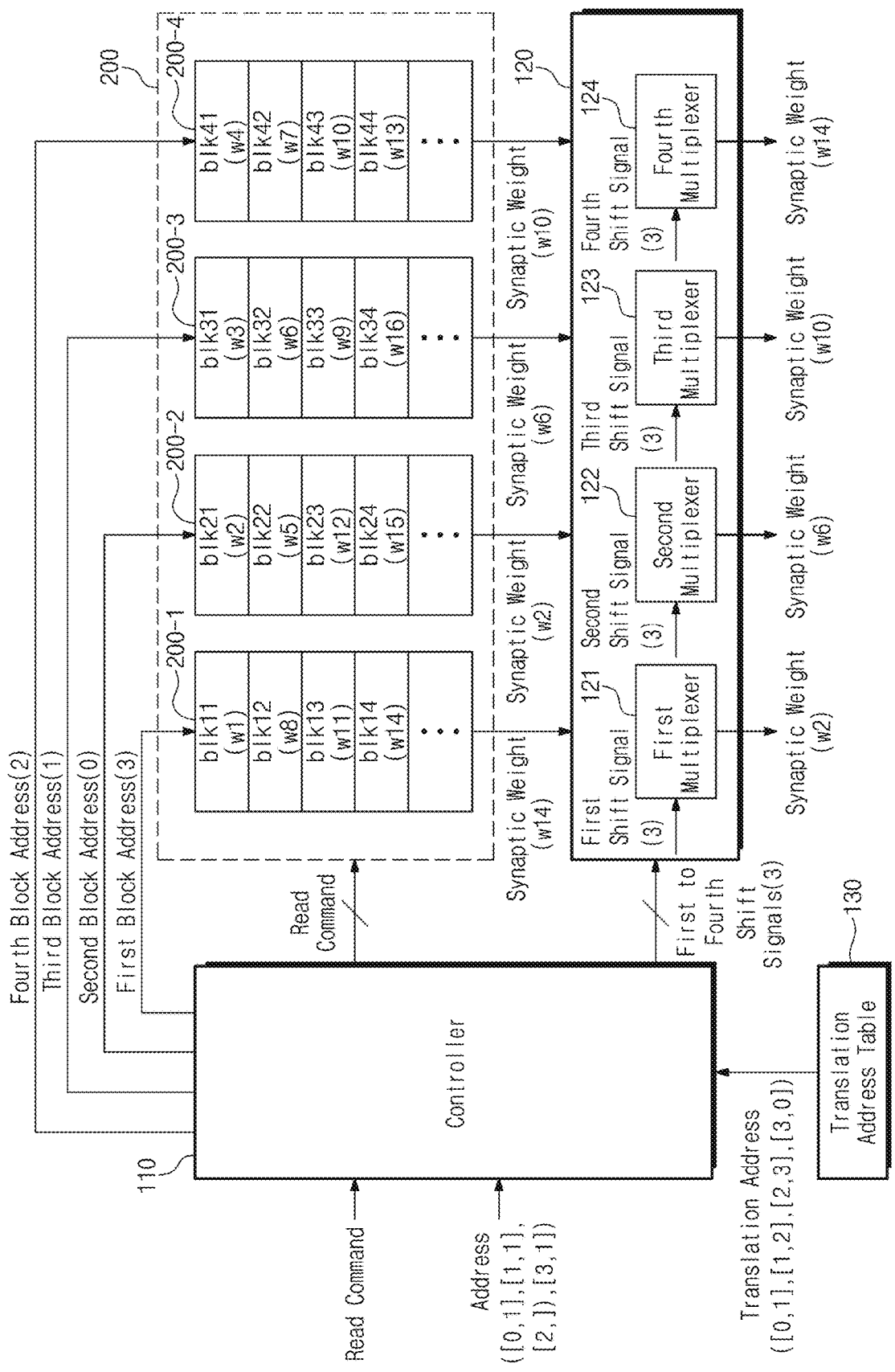
FIG. 9 is a diagram illustrating another example of a read operation of a neuromorphic system of FIG. 3.

FIG. 9 is a diagram illustrating another example of a read operation of a neuromorphic system of FIG. 3. According to a read operation of FIG. 9, the synaptic weights w2, w6, w10, and w14 corresponding to the second postsynaptic neuron N2 of FIG. 4 may be output. Referring to FIG. 9, the neuromorphic system 1000 may include the controller 110, the shifter 120, the translation address table 130, and the plurality of synapse memories 200. The neuromorphic system 1000 may include the first to fourth synapse memories 200-1 to 200-4 as the plurality of synapse memories 200.

The controller 110 may receive a read command and addresses [0, 1], [1, 1], [2, 1], and [3, 1]. The addresses [0, 1], [1, 1], [2, 1], and [3, 1] may be addresses respectively corresponding to the synaptic weights w2, w6, w10, and w14 of the address matrix "A" of FIG. 5.

The controller 110 may obtain translation addresses [0, 1], [1, 2], [2, 3], and [3, 0] respectively corresponding to the addresses [0, 1], [1, 1], [2, 1], and [3, 1] from the translation address table 130. The translation addresses [0, 1], [1, 2], [2, 3], and [3, 0] may be in advance stored in the translation address table 130 in an operation of writing the synaptic weights w2, w6, w10, and w14. However, the inventive concepts is not limited thereto. For example, in a read operation, the controller 110 may translate the addresses [0, 1], [1, 1], [2, 1], and [3, 1] to generate the translation addresses [0, 1], [1, 2], [2, 3], and [3, 0].

The controller 110 may provide first to fourth block addresses to the first to fourth synapse memories 200-1 to 200-4 based on the translation addresses [0, 1], [1, 2], [2, 3], and [3, 0]. For example, the controller 110 may determine a synapse memory targeted for the read operation as the second synapse memory 200-2 based on a memory address "1" of the translation address [0, 1]. The controller 110 may provide the second block address of "0" to the determined second synapse memory 200-2 based on the block address "0" of the translation address [0, 1].

The first to fourth synapse memories 200-1 to 200-4 may respectively receive the first to fourth block addresses together with the read command. Each of the first to fourth synapse memories 200-1 to 200-4 may output a synaptic weight stored in a memory block that the block address indicates. For example, as illustrated in FIG. 9, the first synapse memory 200-1 may output the presynaptic weight w14 stored in the fourth memory block blk14 based on a value of "3" that the first block address indicates.

The first to fourth synapse memories 200-1 to 200-4 may output synaptic weights at the same time based on block addresses from the controller 110. As illustrated in FIG. 9, the first, second, third, and fourth synapse memories 200-1, 200-2, 200-3, and 200-4 may simultaneously output the synaptic weights w14, w2, w6, and w10, respectively. The output synaptic weights w14, w2, w6, and w10 may correspond to the second postsynaptic neuron N2 of FIG. 4.

To reorder the output synaptic weights w14, w2, w6, and w10 in a transfer order of an address (i.e., the order of synaptic weights w2, w6, w10, w14), the controller 110 may generate the first to fourth shift signals based on memory addresses of the translation addresses [0, 1], [1, 2], [2, 3], and [3, 0] and a transfer order of the addresses [0, 1], [1, 1], [2, 1], and [3, 1]. For example, the controller 110 may generate the first shift signal having a value of "3" based on the memory address "0" of the translation address [3, 0] corresponding to the first synapse memory 200-1 and a transfer order "4" of the address [3, 1] corresponding to the translation address [3, 0]. The controller 110 may generate the second shift signal having a value of "3" based on the memory address "1" of the translation address [0, 1] corresponding to the second synapse memory 200-2 and a transfer order "1" of the address [0, 1] corresponding to the translation address [0, 1].

The shifter 120 may include the first to fourth multiplexers 121 to 124. The shifter 120 may reorder an output order of the synaptic weights w14, w2, w6, and w10 output from the first to fourth synapse memories 200-1 to 200-4 by using the first to fourth multiplexers 121 to 124. As illustrated in FIG. 9, in the case where the first to fourth shift signals having a value of "3" are provided, the shifter 120 may recorder the output order by shifting the synaptic weights w14, w2, w6, and w10 as much as "3" and may output the reordered synaptic weights w2, w6, w10, and w14.

Each of the first to fourth multiplexers 121 to 124 may operate based on the corresponding shift signal. For example, in the case where the shifter 120 is a barrel shifter, the first multiplexer 121 may transfer the synaptic weight w2 of the input synaptic weights w14, w2, w6, and w10 in response to the first shift signal having a value of "3". Likewise, the second multiplexer 122 may transfer the synaptic weight w6 of the input synaptic weights w14, w2, w6, and w10 in response to the second shift signal having a value of "3".

The description is given with reference to FIG. 9 as all values of the first to fourth shift signals are "3", but the inventive concepts is not limited thereto. For example, values of the first to fourth shift signals may be differently determined according to a kind and a structure of the shifter 120.

As described above, in the neuromorphic system 1000, different block addresses may be provided to the plurality of synapse memories 200 such that synaptic weights corresponding to a specific postsynaptic neuron are output at the same time. Accordingly, a speed at which synaptic weights stored in the plurality of synapse memories 200 are accessed may be improved.

In the case where the translation address according to an embodiment of the inventive concepts is not used, all synaptic weights corresponding to a specific postsynaptic neuron may be stored in the same synapse memory. In this case, in the case of outputting a synaptic weight from one synapse memory one by one, a read operation may be performed as much as the number of synaptic weights corresponding to a specific postsynaptic neuron, for the purpose of outputting all synaptic weights corresponding to the specific postsynaptic neuron. In the case where the translation address according to an embodiment of the inventive concepts is used, a speed at which synaptic weights corresponding to a specific postsynaptic neuron are accessed may be improved.

Figure 10:
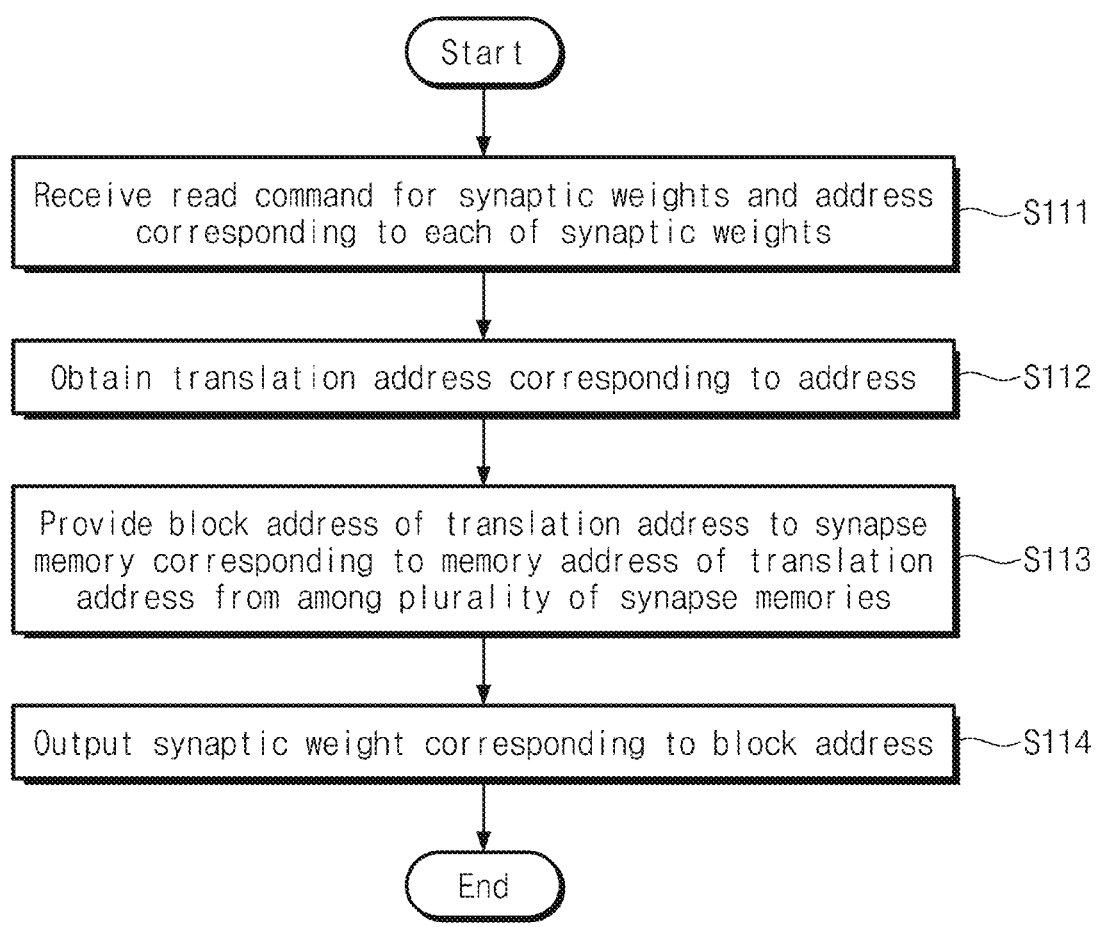
FIG. 10 is a flowchart illustrating a read operation of a neuromorphic system of FIG. 3.

FIG. 10 is a flowchart illustrating a read operation of a neuromorphic system of FIG. 3. Referring to FIGS. 3 and 10, in operation S111, the controller 110 may receive a read command for synaptic weights and an address corresponding to each of the synaptic weights. In operation S112, the controller 110 may obtain a translation address corresponding to each of the received addresses. For example, the controller 110 may store a translation address generated in advance in a write operation and may obtain the stored translation address in a read operation. Alternatively, the controller 110 may generate a translation address by using the same translation rule as the write operation in the read operation.

In operation S113, the controller 110 may provide a block address of the translation address to a synapse memory corresponding to a memory address of the translation address from among a plurality of synapse memories 200. In operation S114, each of the synapse memories 200 may output a synaptic weight corresponding to the block address from the controller 110.

In an embodiment, an order of synaptic weights output from the plurality of synapse memories 200 may be different from a transfer order of an address, depending on translation addresses. Accordingly, the neuromorphic system 1000 may reorder synaptic weights to be output, based on a transfer order of an address. For example, the shifter 120 may reorder an output order of synaptic weights by shifting the synaptic weights to be output. The neuromorphic system 1000 may provide the reordered synaptic weights to a host, based on a transfer order of an address provided from the host.

Figure 11:
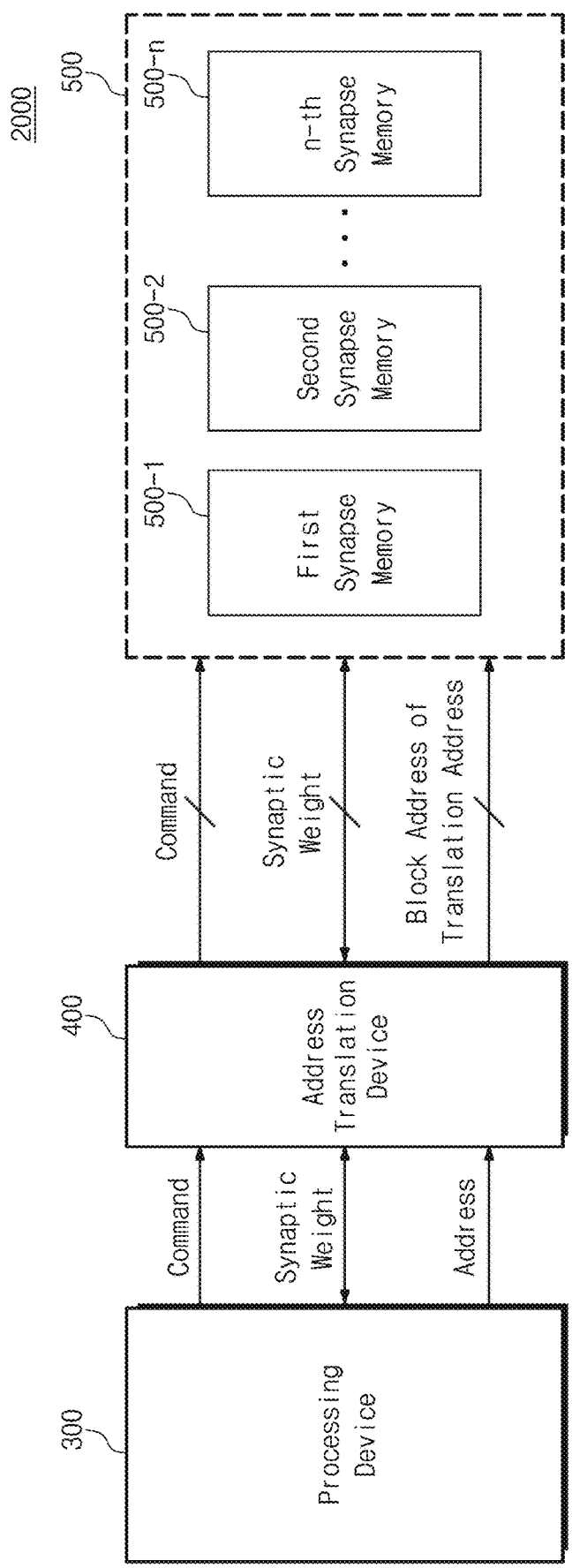
FIG. 11 is a block diagram illustrating a neuromorphic system according to another embodiment of the inventive concepts.

FIG. 11 is a block diagram illustrating a neuromorphic system according to another embodiment of the inventive concepts. Referring to FIG. 11, a neuromorphic system 2000 may include a processing device 300, an address translation device 400, and a plurality of synapse memories 500. Operations of the address translation device 400 and the plurality of synapse memories 500 are similar to the operations of the address translation device 100 and the plurality of synapse memories 200 of FIG. 2, and thus, additional description will be omitted to avoid redundancy.

Based on the neural network of FIG. 1, the processing device 300 may perform learning on input data or may perform inference on the input data. The processing device 300 may update synaptic weights in the process of learning the input data and may store the updated synaptic weights in the plurality of synapse memories 500.

In an operation of updating synaptic weights, a read operation and a write operation may be performed with regard to synaptic weights. In an operation of reading synaptic weights, the processing device 300 may provide a read command and addresses of synaptic weights to be updated to the address translation device 400. The address translation device 400 may obtain a translation address from a provided address and may provide a block address of the translation address to a synapse memory corresponding to a memory address of the translation address.

Each of the first to n-th synapse memories 500-1 to 500-n may output a synaptic weight in response to the read command and the block address. The address translation device 400 may reorder the synaptic weights output from the first to n-th synapse memories 500-1 to 500-n, based on a transfer order of an address provided from the processing device 300. The address translation device 400 may provide the reordered synaptic weights to the processing device 300.

In an operation of writing synaptic weights, the processing device 300 may provide a write command, a synaptic weight to be updated, and an address where the synaptic weight will be stored, to the address translation device 400. The address translation device 400 may obtain a translation address from the provided address and may provide a block address of the translation address and the synaptic weight to a synapse memory corresponding to a memory address of the translation address. Each of the first to n-th synapse memories 500-1 to 500-n may store the received synaptic weight in response to the write command and the block address.

In an embodiment, the processing device 300 may update synaptic weights based on the spike timing dependent plasticity (STDP). The STDP is an algorithm to increase or decrease a value of a synaptic weight in consideration of a time when a neuron outputs a spike. As such, in the case where a spike is generated from a specific presynaptic neuron of FIG. 1, the processing device 300 may update synaptic weights corresponding to the specific presynaptic neuron. For the update, synaptic weights corresponding to the specific presynaptic neuron may be simultaneously output from the first to n-th synapse memories 500-1 to 500-n, and updated synaptic weights may be simultaneously stored in the first to n-th synapse memories 500-1 to 500-n. That is, in the case where a spike is generated from a specific presynaptic neuron, the processing device 300 may quickly access relevant synaptic weights to update the synaptic weights.

Also, in the case where a spike is generated from a specific postsynaptic neuron of FIG. 1, the processing device 300 may update synaptic weights corresponding to the specific postsynaptic neuron. For the update, synaptic weights corresponding to the specific postsynaptic neuron may be simultaneously output from the first to n-th synapse memories 500-1 to 500-n, and updated synaptic weights may be simultaneously stored in the first to n-th synapse memories 500-1 to 500-n. That is, in the case where a spike is generated from a specific postsynaptic neuron, the processing device 300 may quickly access relevant synaptic weights to update the synaptic weights.

As described above, the neuromorphic system according to an embodiment of the inventive concepts may access synaptic weights at the same speed with regard to two cases: an access to synaptic weights corresponding to a specific presynaptic neuron and an access to synaptic weights corresponding to a specific postsynaptic neuron. Accordingly, a speed of the neuromorphic system, at which learning and inference are made with respect to input data, may be improved, without a decrease in a speed at which synaptic weights are accessed, with regard to the two cases.

According to an embodiment of the inventive concepts, there may be provided a neuromorphic system capable of improving a speed at which a synaptic weight stored in a memory is accessed.

Also, according to an embodiment of the inventive concepts, a speed of the neuromorphic system, at which learning and inference are made with respect to input data, may be improved.

While the inventive concepts has been described with reference to exemplary embodiments thereof, it will be apparent to those of ordinary skill in the art that various changes and modifications may be made thereto without departing from the spirit and scope of the inventive concepts as set forth in the following claims.

What is claimed is:

1. A neuromorphic system comprising:
   an address translation device configured to translate an address corresponding to each of a plurality of synaptic weights between presynaptic neurons and postsynaptic neurons to generate a translation address; and
   a plurality of synapse memories configured to store the plurality of synaptic weights based on the translation address,
   wherein the translation address is generated such that at least two of the plurality of synaptic weights corresponding to a same one of the postsynaptic neurons are stored in different synapse memories of the plurality of synapse memories and such that at least two of the plurality of synaptic weights corresponding to a same one of the presynaptic neurons are stored in different synapse memories.

2. The neuromorphic system of claim 1, wherein the address translation device is further configured to:
   transfer each of the synaptic weights to a synapse memory corresponding to a memory address of the translation address from among the plurality of synapse memories; and
   transfer a block address of the translation address to the synapse memory corresponding to the memory address, and
   wherein the synapse memory corresponding to the memory address stores the transferred synaptic weight in a memory block that the block address indicates.

3. The neuromorphic system of claim 2, wherein the address translation device includes:
   a controller configured to generate the translation address from the address in compliance with a given translation rule and to generate a shift signal based on the memory address of the translation address and a transfer order of the address; and
   a shifter configured to transfer each of the synaptic weights to the synapse memory corresponding to the memory address based on the shift signal.

4. The neuromorphic system of claim 3, wherein the controller is configured to:
   generate an identical shift signal with respect to synaptic weights, of the plurality of synaptic weights, corresponding to each of the presynaptic neurons; and
   generate different shift signals with respect to synaptic weights, of the plurality of synaptic weights, corresponding to different presynaptic neurons.

5. The neuromorphic system of claim 1, wherein the address translation device is configured to transfer a block address of the translation address to a synapse memory corresponding to a memory address of the translation address from among the plurality of synapse memories, and
   wherein the synapse memory corresponding to the memory address is configured to output a synaptic weight from a memory block that the block address indicates.

6. The neuromorphic system of claim 5, wherein the address translation device is configured to transfer identical block addresses to the plurality of synapse memories, and
   wherein the plurality of synapse memories are configured to output synaptic weights corresponding to a specific presynaptic neuron of the presynaptic neurons in response to the identical block addresses.

7. The neuromorphic system of claim 5, wherein the address translation device is configured to transfer different block addresses with respect to the plurality of synapse memories, and
   wherein the plurality of synapse memories are configured to output synaptic weights corresponding to a specific postsynaptic neuron of the postsynaptic neurons in response to the different block addresses.

8. The neuromorphic system of claim 5, wherein the address translation device includes:
a conversion address table configured to store the address and the translation address;
a controller configured to generate a shift signal based on a transfer order of the address and the memory address of the translation address stored in the conversion address table; and
a shifter configured to reorder the output synaptic weight based on the shift signal so as to correspond to the transfer order of the address.

9. The neuromorphic system of claim 1, further comprising:
a processing device configured to update the synaptic weights based on a spike of the presynaptic neurons or the postsynaptic neurons,
wherein the plurality of synapse memories are configured to store the updated synaptic weights based on a translation address corresponding to each of the updated synaptic weights.

10. An operating method of a neuromorphic system which includes a plurality of synapse memories storing a plurality of synaptic weights between presynaptic neurons and postsynaptic neurons, the method comprising:
translating an address corresponding to each of the plurality of synaptic weights in response to a write command for the plurality of synaptic weights to generate a translation address; and
storing the plurality of synaptic weights in the plurality of synapse memories based on the translation address,
wherein the translation address is generated such that at least two of the plurality of synaptic weights corresponding to a same one of the postsynaptic neurons are stored in different synapse memories of the plurality of synapse memories and such that at least two of the plurality of synaptic weights corresponding to a same one of the presynaptic neurons are stored in different synapse memories.

11. The method of claim 10, further comprising:
providing each of the synaptic weights to a synapse memory corresponding to a memory address of the translation address from among the plurality of synapse memories; and
providing a block address of the translation address to the synapse memory corresponding to the memory address,
wherein the storing of the synaptic weights includes:
storing each of the synaptic weights in the synapse memory corresponding to the memory address, based on the block address.

12. The method of claim 11, further comprising:
generating a shift signal based on a transfer order of the address and the memory address of the translation address,
wherein each of the synaptic weights is transferred to the synapse memory corresponding to the memory address based on the shift signal.

13. The method of claim 12, wherein the shift signal is identically generated with respect to synaptic weights corresponding to each of the presynaptic neurons and is differently generated with respect to synaptic weights corresponding to different presynaptic neurons.

14. The method of claim 10, further comprising:
receiving a read command for the synaptic weights and an address corresponding to each of the synaptic weights; and
outputting the synaptic weights from the plurality of synapse memories based on the translation address corresponding to the address in response to the read command.

15. The method of claim 14, wherein the outputting of the synaptic weights includes:
obtaining the translation address corresponding to the address;
providing a block address of the translation address to a synapse memory corresponding to a memory address of the translation address from among the plurality of synapse memories; and
outputting a synaptic weight corresponding to the block address from the synapse memory corresponding to the memory address.

16. The method of claim 15, further comprising:
generating a shift signal based on a transfer order of the address and the memory address of the translation address; and
reordering the output synaptic weights based on the shift signal so as to correspond to the transfer order of the address.

17. A neuromorphic system comprising:
an address translation device configured to generate translation addresses by shifting memory addresses of first row addresses of an address matrix corresponding to neural network-based synaptic weights as much as a first value and shifting memory addresses of second row addresses of the address matrix as much as a second value different from the first value; and
a plurality of synapse memories configured to reorder the synaptic weights by storing the synaptic weights corresponding to the memory addresses in corresponding synapse memory based on the translation addresses,
wherein the first and second values are each greater than zero.

18. The neuromorphic system of claim 17, wherein the first value and the second value are an integer that is less than a number of the plurality of synapse memories and is 0 or more.

19. The neuromorphic system of claim 17, wherein the address translation device is further configured to:
transfer the synaptic weights corresponding to the translation addresses such that each of the translation addresses to is transferred to a synapse memory corresponding to a memory address of the translation addresses; and
transfer a block address of each of the translation addresses to the synapse memory corresponding to the memory address, and
wherein the synapse memory corresponding to the memory address stores the transferred synaptic weight in a memory block that the block address indicates.

20. The neuromorphic system of claim 17, wherein the address translation device is further configured to transfer a block address of each of the translation addresses to a synapse memory corresponding to a memory address of each of the translation addresses from among the plurality of synapse memories, and
wherein the synapse memory corresponding to the memory address is configured to output a synaptic weight from a memory block that the block address indicates.

* * * * *

UNITED STATES PATENT AND TRADEMARK OFFICE
CERTIFICATE OF CORRECTION

Page 1 of 1

PATENT NO. : 11,556,765 B2
APPLICATION NO. : 16/454881
DATED : January 17, 2023
INVENTOR(S) : Jae-Joon Kim, Jinseok Kim and Taesu Kim It is certified that error appears in the above-identified patent and that said Letters Patent is hereby corrected as shown below:

On the Title Page

Item (73) Assignee, Replace "POSTECH ACADEMY-INDUSTRY FOUNDATION, Gyeongsngbukdo (KR)" with "Samsung Electronics Co., LTD., Suwon-si (KR)"

Signed and Sealed this
Eighteenth Day of April, 2023

Katherine Kelly Vidal
*Director of the United States Patent and Trademark Office*